United States Patent [19]
Inselberg et al.

[11] Patent Number: 5,631,982
[45] Date of Patent: May 20, 1997

[54] SYSTEM USING PARALLEL COORDINATES FOR AUTOMATED LINE DETECTION IN NOISY IMAGES

[75] Inventors: Alfred Inselberg, Los Angeles; Avijit Chatterjee, Venice; Bernard Dimsdale, Santa Monica, all of Calif.

[73] Assignee: International Business Machines Corporation, Armonk, N.Y.

[21] Appl. No.: 306,223

[22] Filed: Sep. 14, 1994

Related U.S. Application Data

[63] Continuation of Ser. No. 74,901, Jun. 10, 1993, abandoned.
[51] Int. Cl.$^6$ .............................. G06K 9/36; G06K 9/00; G06F 17/14
[52] U.S. Cl. ........................ 382/281; 382/225; 382/168
[58] Field of Search ...................................... 382/192, 199, 382/202, 205, 276, 224, 225, 281, 288, 168

[56] References Cited

U.S. PATENT DOCUMENTS

| | | | |
|---|---|---|---|
| 4,648,120 | 3/1987 | Chittineni | 382/27 |
| 4,731,860 | 3/1988 | Wahl | 382/281 |
| 5,073,962 | 12/1991 | Califano | 382/27 |
| 5,341,437 | 8/1994 | Nakayama | 382/281 |
| 5,347,595 | 9/1994 | Bokser | 382/36 |

OTHER PUBLICATIONS

"An Adaptive Operator Set", Proceedings of the Fifth International Conference on Pattern Recognition, Miami Beach, Florida, U.S.A., 01–04 Dec. 1980, IEEE, New York, pp. 1304–1307.

"A Hierarchical Approach To Line Extraction Based on the Hough Transform", Computer Vision, Graphics and Image Processing, Oct. 1990, vol. 52, No. 1, pp. 57–77.

"Parallel Coordinates for Multi–Dimensional Graphics", National Computer Graphics Association Conference, Philadelphia, PA, 22–26 Mar. 1987, vol. 3, pp. 547–566.

Califano et al. "Generalized Neighborhoods: A New Approach to Complex Parameter Feature Extraction" Proc. CVPR '89 IEEE Computer Society Conf. on Comp. Vision and Pat. Rec. pp. 192–199 Jun. 1989.

Boldt et al. "Token–Based Extraction of Straight Lines", Nov. 1989, IEEE Transactions on Systems, Man and Cybernetics, pp. 1581–1594.

Inselberg et al. "Parallel Coordinates: A Tool for Visualizing Multi–Dimensional Geometry" 1990, IEEE/IEE Publications On disc.

Primary Examiner—Leo Boudreau
Assistant Examiner—Bipin Shalwala
Attorney, Agent, or Firm—Baker, Maxham, Jester & Meador

[57] ABSTRACT

A system for detecting lines in images using line neighborhoods and a parallel coordinate transformation. The process introduces the concept of line neighborhoods to accommodate the uncertainty in line detection arising from image noise. Because line neighborhoods in Cartesian coordinates have ambiguous and unbounded regions and always overlap one another, a parallel coordinate transform is used to transform Cartesian coordinate image plane line segments to points in a bounded and nonambiguous region of the parallel coordinate transform plane. Line detection then becomes a simple problem of detecting point clusters in the parallel coordinate transform plane.

29 Claims, 16 Drawing Sheets

SYSTEM USING PARALLEL COORDINATES FOR AUTOMATED LINE DETECTION IN NOISY IMAGES

CROSS-REFERENCE TO RELATED APPLICATION

This application is a Rule 1.62 File-Wrapper Continuation of patent application Ser. No. 08/074,901, now abandoned, filed Jun. 10, 1993.

BACKGROUND OF THE INVENTION

1. Field of the Invention

This invention relates to automated systems for image detection and, more specifically, to a computer-implemented procedure for extracting lines from an image data field.

2. Discussion of the Related Art

In two-dimensional images containing man-made objects, grey-level discontinuities that lie along straight lines abound. Examples include such things as manufactured parts, buildings, aerial photographs of towns and road systems and so forth. Accordingly, the automated detection of straight lines in a two-dimensional image is a fundamentally important function of artificial vision systems.

The line detection problem is recognized in part as a problem of establishing meaningful groups of edge points that lie along straight lines. The Hough transform is a well-known method in the art for detecting edge points that satisfy a collinearity constraint. The Hough transform is limited to examination of the collinearity of image points. The distribution of such points along a line is not considered. Although this feature makes the Hough transform insensitive to missing edge points and occlusions, the lack of such proximity constraints often leads to errors when processing complex images. The simplest improved approach in the art merely adds the proximity requirement as a post-processing step in the Hough transformation procedure. However, the proper measure of the resulting proximity constraint is an open question in such a simple augmented Hough transform procedure. It is generally accepted that the proximity constraint should be a function of feature size; that is, the length of the lines detected.

Practitioners in the art have suggested more sophisticated and efficient methods for finding straight lines in edge maps using the Hough transform. For instance, John Princen, et al ("A Hierarchical Approach To Line Extraction Based on the Hough Transform", Computer Vision, Graphics and Image Processing, October 1990, Vol. 52, No. 1, pp. 57–77) teach a modified Hough transform procedure based on a pyramid structure with each layer in the pyramid splitting the complete image into a number of subimages. At the bottom level of the pyramid, short line segments are detected by applying a Hough transform to small subimages. The procedure then progresses from the bottom up by grouping small line segments into longer lines. Line segments having local support propagate up the hierarchy and participate in higher level groupings. The length of the line detection determines the pyramid level to which it propagates. However, the Princen, et al procedure offers no particular method for improving line detection in noisy images.

The difficulties introduced into the edge detection problem by image noise fields are well-known in the art and have been addressed by other practitioners. For instance, L. E. Nordell, et al ("An Adaptive Operator Set", Proceedings of the Fifth International Conference on Pattern Recognition, Miami Beach, Fla., U.S.A., 01–04 December 1980, IEEE, New York, pp. 1304–1307) introduce a complementary method for handling the segmentation problem for line detection using sets of direction-dependent filters. They suggest that the problem may be converted to a homogeneity determination problem by defining lines and edges as transitions between homogeneous regions of the image. They teach the use of an adaptive process that selects the proper transform operator according to the degree of local homogeneity in the image. Their selected operator forms part of a larger set of operators that have application to structured image processing. One such operator discussed by Nordell, et al assigns to every pixel a complex value representing the direction and magnitude of the corresponding edges. Different operator sizes are assigned to different areas of the image to optimized edge detection without blurring.

Also, V. S. Alagar, et al ("Algorithms for Detecting M-Dimensional Objects in N-Dimensional Spaces", IEEE Transactions on Pattern Analysis and Machine Intelligence, Vol. PAMI-3, No. 3, pp. 245–256, May 1981) consider another solution to the noisy-image edge detection problem. They propose transform methods and notions of probability measures governing the parameters of transforms for the case of uniformly distributed noise within an image space. They suggest that different quantization schemes for the transformed space are desirable for different problastic assumptions for noise and also extend the two-dimensional line detection problem to general N-dimensional space. Alagar, et al introduce three measures of robustness (precision, recall and goodness ) to describe the effectiveness of various line detection procedures when applied to noisy images. Their evaluations are based on the generalized Duda-Hart procedure known in the art, which uses the normal parameters (r, θ) to specify line. The Duda-Hart improvement over the Hough transform permits line detection by cluster detection in r-θ space but is replete with inaccuracies and limitations, including ambiguities in r-θ cell membership. Alagar, et al examine the generalized Duda-Hart procedure in detail and also evaluate several improvements suggested by other practitioners in the art. However, Alagar, et al do not themselves suggest a solution to the general ambiguity problem associated with the Duda-Hart line-segment point mapping procedures.

The art of manipulating multivariate relationships of multi-dimensional data is unrelated to the image detection art and is generally associated with methods for representing N-dimensional events such as air traffic control scenarios, hypersurfaces and the like. For instance, Alfred Inselberg, et al ("Parallel Coordinates for Multi-Dimensional Graphics", National Computer Graphics Association Conference, Philadelphia, Pa., 22–26 March 1987, Vol. 3, pp. 547–566) demonstrate the application of a Cartesian-coordinate to parallel-coordinate transform to the air traffic control display problem. Their paper is entirely incorporated herein by this reference. The concept of parallel coordinates was first introduced circa 1985 for use in multivariate displays and graphics. Until now, the parallel coordinate transform has not been applied to automated line detection or vision system procedures.

The notion of image point neighborhoods is known to be useful in detecting points in noisy images. However, this notion cannot be readily extended to "line neighborhoods" because of an inherent ambiguity for such neighborhoods in normal coordinate systems leading to unacceptable "false line" detections. Because of this inherent ambiguity problem known in the art, there exists a clearly-felt need for a nonambiguous line-to-point transform method for edge detection in noisy images. The related unresolved problems and deficiencies are clearly felt in the art and are solved by this invention in the manner described below.

SUMMARY OF THE INVENTION

The procedure of this invention provides a two-part solution to the above-described deficiencies. The first concept of this invention is a new concept of line neighborhoods, which is introduced to accommodate the uncertainty arising from noise in the image data. Because line neighborhoods in Cartesian coordinates have the same ambiguity problems noted for the Duda-Hart procedure, the Cartesian-coordinate (CC) to parallel-coordinate (PC) transformation is introduced as the second concept of this invention to remove these ambiguities. The other important problem with line neighborhoods in Cartesian coordinates is that the neighborhood regions are unbounded and thus different neighborhoods always overlap. Moreover, the line neighborhood intersection is cumbersome to describe and always has inherent ambiguity. The introduction of parallel coordinates removes the overlap problem, removes the ambiguity problem and transforms unbounded neighborhoods into bounded neighborhoods in all cases. Moreover, the parallel coordinate concept of this invention also in all cases provides for direct generalization to N-dimensions.

Any line in Cartesian coordinates can be transformed into a single point in parallel coordinates f the line slope is not unity. The transform point always falls within a bounded region of the parallel coordinate plane if the image line slope is nonpositive. Thus, all image lines in the Cartesian coordinate plane can be transformed (mapped) to transform points within a bounded region of the parallel coordinate plane in at least one of two groups; a first group including all nonpositive sloping image lines and a second group including all positive sloping image lines with a slope coefficient sign reversal.

Line detection in parallel coordinates becomes a simple problem of detecting clusters of points representing collinear segments in the Cartesian plane. The line neighborhood test in Cartesian coordinates becomes a simple "bin counting" problem on the parallel coordinate plane. The "collinearity" test becomes a simpler "colocation" test. Line detection in additional image noise may be accommodated merely by increasing the "neighborhood bin" dimensions in the parallel coordinate plane.

It is therefore an object of this invention to provide a simple computer-implemented line detection procedure that identifies collinear segment clusters without ambiguity in the presence of image noise. It is an advantage of the method of this invention that the transform technique converts the CC line detection problem to a PC point cluster detection problem.

It is another objective of this invention to minimize the detection of extraneous lines. It is another advantage of the method of this invention that proximity constraints in the image plane may be easily added to the colinearity constraint represented by cluster (proximity) detection in the PC plane, thereby further reducing the rate of false line detections.

The preferred method of this invention uses the normal (r,θ) form of a line equation in ($X_1$, $X_2$) image space and defines line neighborhoods according to increments in radius and angle. The (X, Y) transform space represents nonpositive-slope image lines in the region bounded between the parallel $\bar{X}_1$ and $\bar{X}_2$ axes, which is divided into neighborhood buckets corresponding to the image space increments of size Δr by Δθ. All possible pairs of image points that satisfy predetermined image space distance criteria are then mapped as line segments to their respective (Δr, Δθ) buckets in the PC transform plane, provided that they have nonpositive slope. Next, clusters are found among these neighborhood buckets and reported as candidate image line detections. Once a line candidate is detected, the actual image line segment is derived by extending the initial image line to the extreme image plane coordinates found in the cluster neighborhood. The image line candidates are assigned a measure of confidence or quality that depends on the number of points in the cluster divided by the length of the corresponding image line segment. This process is repeated for a second group of image point pairs describing lines of positive slope.

The line detection method of this invention addresses the problem of defining a topology for neighborhoods of lines (instead of points) in the CC image plane. Line neighborhood topology is unlike point neighborhood topology. Because of the duality of lines/points between the CC/PC planes discussed herein, a line in one can be transformed to a point in the other. This transformation solves the line neighborhood ambiguity problem found in the CC image plane, permitting the exploitation of the line neighborhood concept for the first time.

The foregoing, together with other objects, features and advantages of this invention will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein:

FIG. 1, comprising

FIG. 2, comprising

FIG. 3, comprising

FIG. 4, comprising

FIG. 5, comprising

FIG. 6 comprising

DETAILED DESCRIPTION OF THE PREFERRED EMBODIMENTS

Line Neighborhoods In The Image Plane

The first fundamental concept underlying the method of this invention is the concept of "line neighborhoods" on the Cartesian or image plane. The objective of this invention is to detect line segments in a bitmap of a two-dimensional image in Cartesian Coordinates (CC). A line in CC is defined by two independent parameters, which may be two image points ($P_1$, $P_2$) on the Cartesian plane, a slope (m) and intercept (b), a radius r and angle $\theta$, or any other two independent parameters. In applications where these parameters are derived from image data and subject to image noise, it is impossible to obtain unique lines. For this reason, ranges or "neighborhoods" are defined for the two parameters when defining a line in noisy image data. The parameter ranges describe a region on the CC image plane that is herein denominated a "neighborhood".

The line neighborhood is defined in one of several ways, depending on the selection of parameters used to define the line and the method used to define image "point" neighborhoods. Unfortunately, while "point" neighborhoods are known to be bounded and nonambiguous, line neighborhoods in CC are generally ambiguous and unbounded. This can be better appreciated with reference to the below discussion in connection with FIGS. 1–5. Because of ambiguities in CC line neighborhoods, some line candidates in the image plane cannot be unambiguously included in or excluded from a specific line neighborhood. Because CC line neighborhoods are unbounded, detection of longer lines is therefore always hampered by increases in false line detections.

The second fundamental concept underlying the method of this invention is introduced to overcome the known deficiencies of the CC line neighborhood. This is the Parallel Coordinate transform.

The Parallel Coordinate Transform Plane

The method of this invention departs significantly from the earlier art because the Parallel Coordinate (PC) transform is introduced to map CC lines (instead of points) to a parametric space. The reason for mapping lines is that a CC line is represented as a point on the PC plane and hence the line detection (colinearity) problem reduces to a simpler problem of detecting point clusters (proximity). Also, the "neighborhood" represented in PC is a nonambiguous and bounded "point neighborhood" within a bounded region for all image plane lines having nonpositive slopes.

The general principles of multi-dimensional transformation from CC to PC can be appreciated with reference to the above-cited Inselberg, et al. reference incorporated herein.

The following discussion of PC transforms is limited to the two-dimensional application relating to line detection, but can be easily generalized to N-dimensions.

Figure 1A:
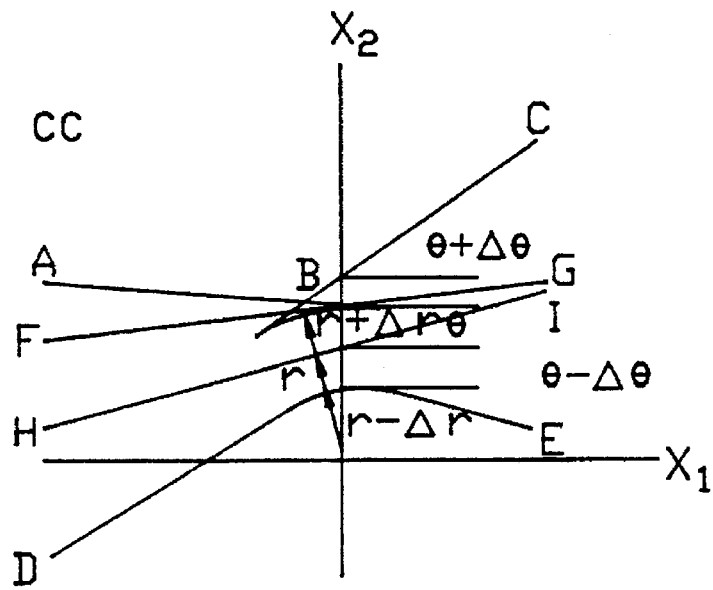
FIGS. 1A and 1B, illustrates a line neighborhood in normal (r, θ) form for the Cartesian coordinate (CC) and parallel coordinate (PC) planes.
Figure 1B:
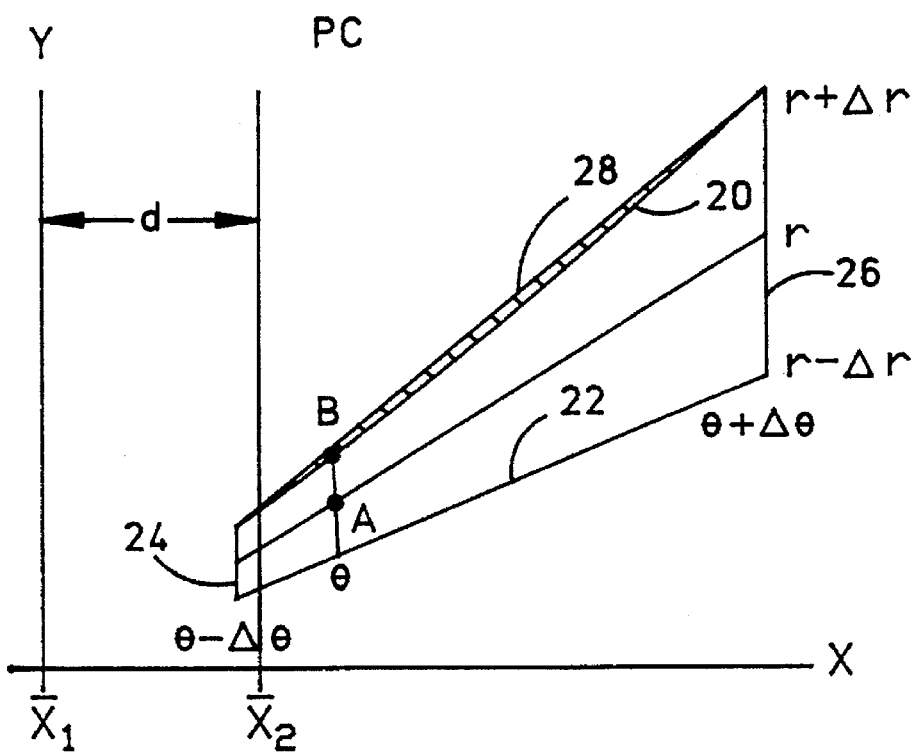

FIGS. 1A–1B show the line neighborhood of this invention for a line (HI) in the CC image plane and a point (A) in the PC transform plane, respectively. Any image line in two dimensions can be represented by two parameters. By defining ranges for the two normal (r, $\theta$) parameters, a family of lines is defined as the line neighborhood of the image line HI shown in FIG. 1A. Image line HI is represented in the normal (r, $\theta$) form, which is $x_2(\cos\theta)=x_1(\sin\theta)+r$, where r is the perpendicular distance of the line from the origin and $\theta$ is the angle made by the line HI with the positive direction of the $X_1$-axis (counter-clockwise is positive).

In FIG. 1A, the line neighborhood in normal form can be defined by selecting values for $\Delta r$ and $\Delta\theta$. Thus, the angle $\theta$ has a neighborhood represented by $\pm\Delta\theta$ and r has a neighborhood represented by $\pm\Delta r$. The CC representation of the line neighborhood of FIG. 1A has an upper and a lower neighborhood boundary. The upper boundary consists of the two tangents AB and BC, which are tangent to the arc having radius $r+\Delta r$ at the respective angles $\theta-\Delta\theta$ and $\theta+\Delta\theta$ with respect to the positive $X_1$-axis. The lower neighborhood boundary consists of the two tangents D and E, which make respective angles $\Delta-\Delta\theta$ and $\theta+\Delta\theta$ with respect to the $X_1$-axis. The two tangents D and E are tangent to the arc of radius $r-\Delta r$ and together describe a smooth continuous lower boundary. Note that the upper boundary does not contain any of the $r+\Delta r$ arc analogous to the $r-\Delta r$ are portion of the lower neighborhood boundary. This demonstrates the inherent ambiguity of the CC line neighborhood shown in FIG. 1A. Note that line segment FG falls within the upper boundary of the tangents ABC but outside of the $r+\Delta r$ are. Thus, line segment FG is both within and without the line neighborhood described in FIG. 1A. Also, note that the line neighborhood defined between upper boundary ABC and lower boundary DE in FIG. 1A is unbounded and thus infinite in extent, encompassing an indefinite number of possible segments.

The transformation from the CC image plane in FIG. 1A to the PC transform plane in FIG. 1B is accomplished by applying a PC transform operator representing the fundamental point/line duality known for parallel coordinates. In the PC transform plane of FIG. 1B, a point in the CC image plane is represented by a single line segment between the parallel $\overline{X}_1$ and $\overline{X}_2$ axes. That is, each point ($x_1$, $x_2$) in the CC image plane is represented by the infinite line in the PC transform plane and $\overline{X}_2$ axes in FIG. 1B is arbitrarily defined as d. All such infinite lines in the PC plane generated by a single line in the CC image plane intersect at a single point (A) in the PC transform plane. Herein, image line HI ($x_2=mx_1+b, m<\infty$) is said to "map" to the transform point A in the PC transform plane. Point A represents an infinite collection of lines on the PC transform plane which, when $m\neq 1$, intersect at the point A: $(d/(1-m), b/(1-m))=(x,y)$ on the PC plane with coordinates in X and Y. Note that A may lie outside the strip between the parallel $\overline{X}_1$ and $\overline{X}_2$ axes. In fact, only lines in the CC image plane having nonpositive slope will fall between the two parallel $\overline{X}_1$ and $\overline{X}_2$ axes in the PC transform plane.

To avoid the problem that occurs when m=1, a special "ideal point" with tangent direction (b/d) may be introduced or, more preferably, only nonpositive-sloping lines in cc image plane are transformed to the PC transform plane. Positive sloping lines are segregated and treated separately as their reflections. This preferred solution has the additional advantage of restricting points in the PC transform plane to the region bounded by the parallel $\bar{X}_1$ and $\bar{X}_2$ axes. The only disadvantage is that the image data in the CC image plane must be transformed in two groups of lines, with the positive-sloping lines segregated and inverted in slope.

Using the above-described PC transformation, line HI in FIG. 1A is transformed to the point A in FIG. 1B. Moreover, in normal (r,θ) form, the line neighborhood maps to the PC transform plane as a four-sided point neighborhood bin or bucket formed by hyperbolic arcs 20 and 22 joined on the sides by vertical line segments 24 and 26. Arcs 20 and 22 represent the r+Δr and r−Δr neighborhood bin boundaries and segments 24 and 26 represent the θ−Δθ and θ+Δθ neighborhood bin boundaries discussed in connection with FIG. 1A. Ambiguous lines such as line FG in the CC image plane are not ambiguous with respect to the corresponding PC transform plane point neighborhood. Line FG maps to the point B in FIG. 1B. The region of image plane ambiguity is illustrated in FIG. 1B as the shaded region 28 in the transform plane.

Figure 2A:
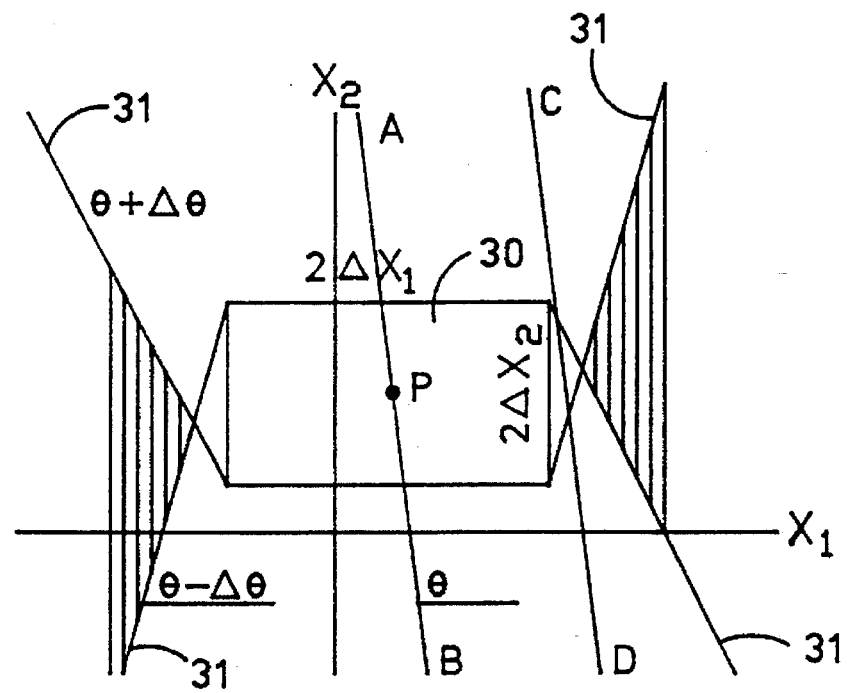
FIGS. 2A and 2B, illustrates a line neighborhood in rectangular angle-point (θ,P) form for both CC and PC planes.
Figure 2B:
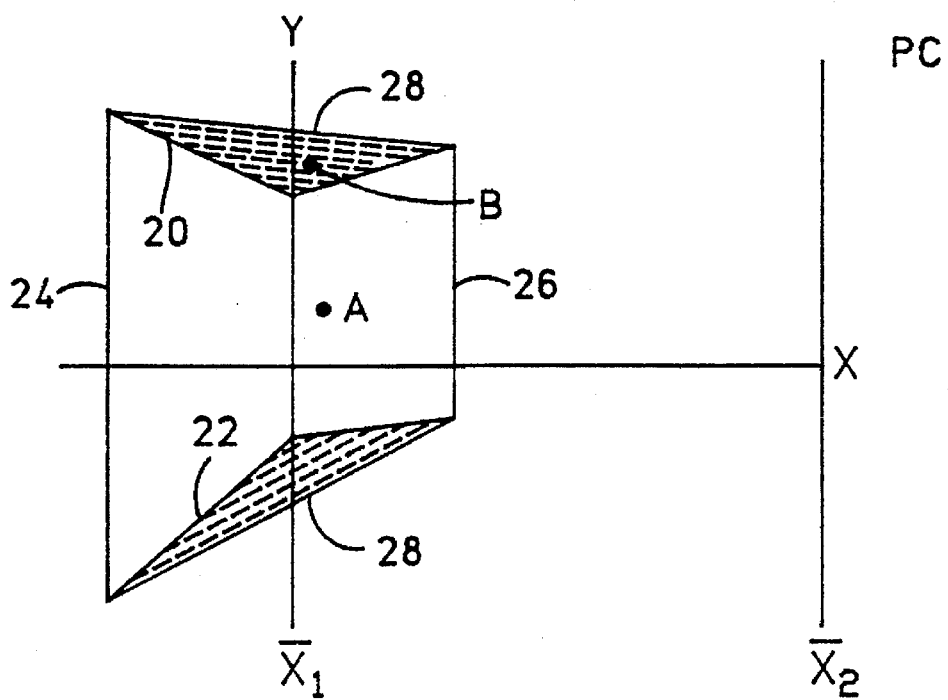

A line in the CC image plane may also be represented by a point P: $(x_1, x_2)$ through which the line passes and an angle θ with respect to the positive $X_1$-axis (counter-clockwise is positive). FIGS. 2A–2B show the effects of the PC transform on a line neighborhood expressed in rectangular angle-point (θ,P) form in the CC image plane. The point neighborhood is shown in FIG. 2A as the box 30 with dimensions $2\Delta x_1$ by $2\Delta x_2$. The angle neighborhood shown between the lines 31 defined by θ+Δθ and θ−Δθ in FIG. 2A. The line AB is the image line through the point P with angle θ for which the line neighborhood is defined. In FIG. 2B, the transform point A is the corresponding PC transform of image line AB. In FIG. 2A, image line CD is an ambiguous line that falls outside of box 30 but is still inside of the angle neighborhood region defined by ±Δθ. The region in the PC transform plane containing all such ambiguous image lines is shown as shaded regions 28, which contains the point B mapping of ambiguous line CD. The point neighborhood bin in FIG. 2B is again defined by the two vertical line segments 24 and 26 and the line segment pairs 20 and 22 representing the four vertices of the rectangle. Note that because image line AB in FIG. 2A has nonpositive slope, transform point A falls between the parallel $\bar{X}_1$ and $\bar{X}_2$ axes in FIG. 2B.

Figure 3A:
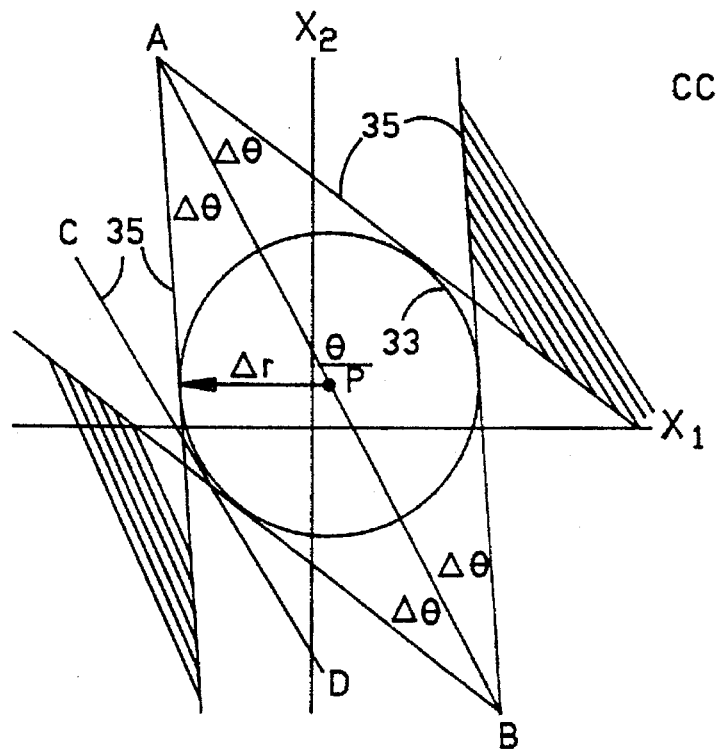
FIGS. 3A and 3B, shows a line neighborhood in circular angle-point (θ, P) form on both the CC and PC planes.
Figure 3B:
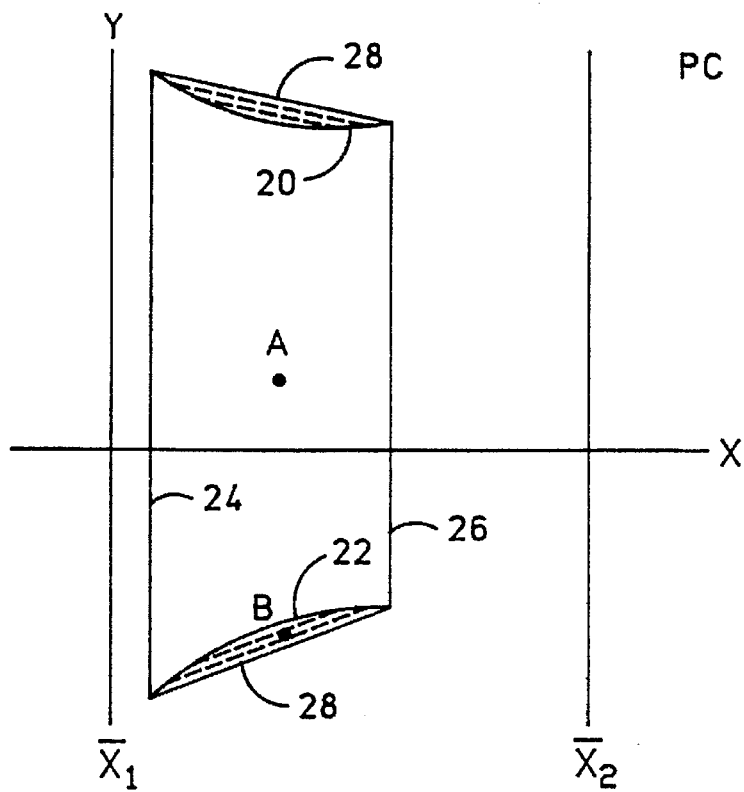

A line represented in angle-point (θ,P) form may also have a line neighborhood defined in r and θ, such as shown in FIG. 3A. The neighborhood of point P is shown as a circle 33 having radius Δr and the angle neighborhood±Δθ is defined by the two pairs of lines 35 tangent to the neighborhood circle around point P. The image line AB through point P is mapped to transform point A in the PC transform plane shown in FIG. 3B. The unshaded region in FIG. 3A contains all the image lines in the line neighborhood of line AB. The image line CD is an ambiguous line falling outside of the Δr neighborhood and inside of the±Δθ neighborhood, mapping to transform point B in FIG. 3B. All such ambiguous lines will map to the shaded regions 28 in the PC transform plane of FIG. 3B.

Figure 4A:
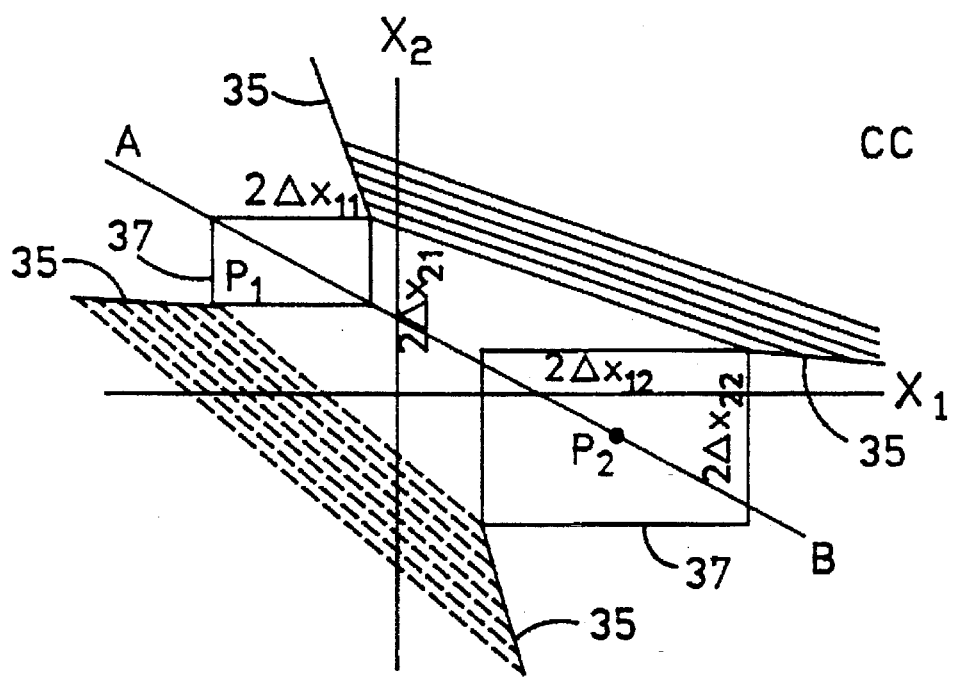
FIGS. 4A and 4B, shows a line neighborhood in rectangular two-point ($P_1$, $P_2$) form on both the CC and PC planes.
Figure 4B:
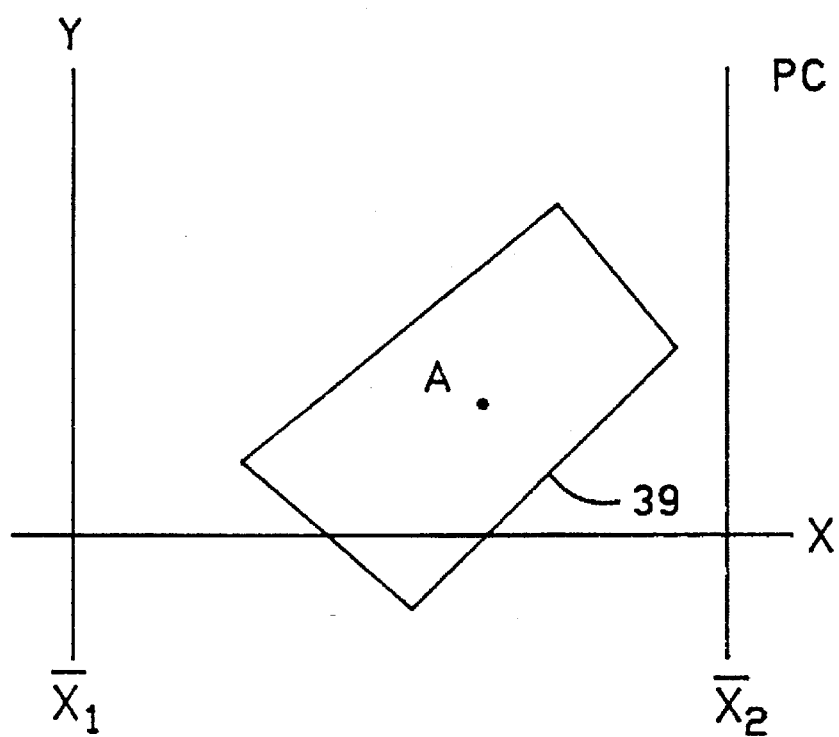
Figure 5A:
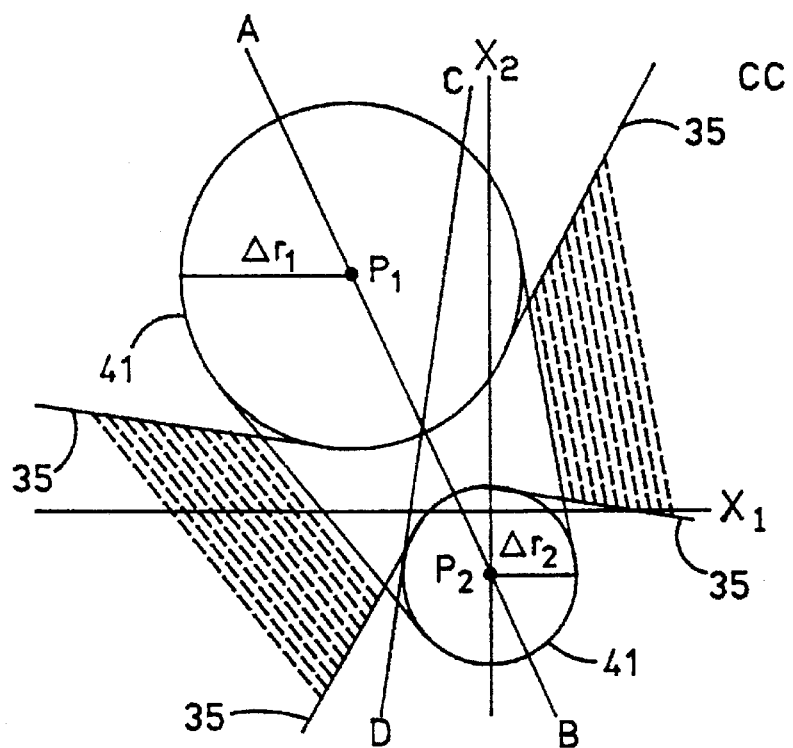
FIGS. 5A and 5B, shows a line neighborhood in circular two-point ($P_1$, $P_2$) form on both the CC and PC planes.

As is well-known, any image line may also be represented by two of its points, $P_1(x_{11}, x_{21})$ and $P_2(x_{12}, x_{22})$, as shown in FIGS. 4A and 5A. In FIG. 4A, the image line AB is defined by points $P_1$ and $P_2$ and the image line neighborhood is defined by a rectangular box 37 around each of the two points. Thus, rectangle ($\pm\Delta x_{11}$ by $\pm\Delta x_{21}$) defines the point neighborhood around point $P_1$, rectangle ($\pm\Delta x_{12}$ by $\pm\Delta x_{22}$) defines the point neighborhood around $P_2$, and the line neighborhood is bounded by lines 35, which include all lines intersecting points in both boxes 37. There is ambiguity in the CC image plane in FIG. 4A only if either of the pair of intervals defining the two boxes overlap. It is important to note for both FIGS. 4A and 5A that potential ambiguity increases dramatically as the distance between the points $P_1$ and $P_2$ decreases. This suggests that a minimum distance should be maintained between the two points to obtain line neighborhoods with less or no ambiguity. The line neighborhood in the CC image plane of FIG. 4A maps to a point neighborhood bin 39 on the PC transform plane of FIG. 4B enclosed by four straight lines. The bin is quadrilateral instead of partially hyperbolic because of the rectangular point neighborhood definitions used in FIG. 4A. Because neither of the intervals defining the two boxes in FIG. 4A overlap, there are no ambiguous regions shown in FIG. 4B.

Figure 5B:
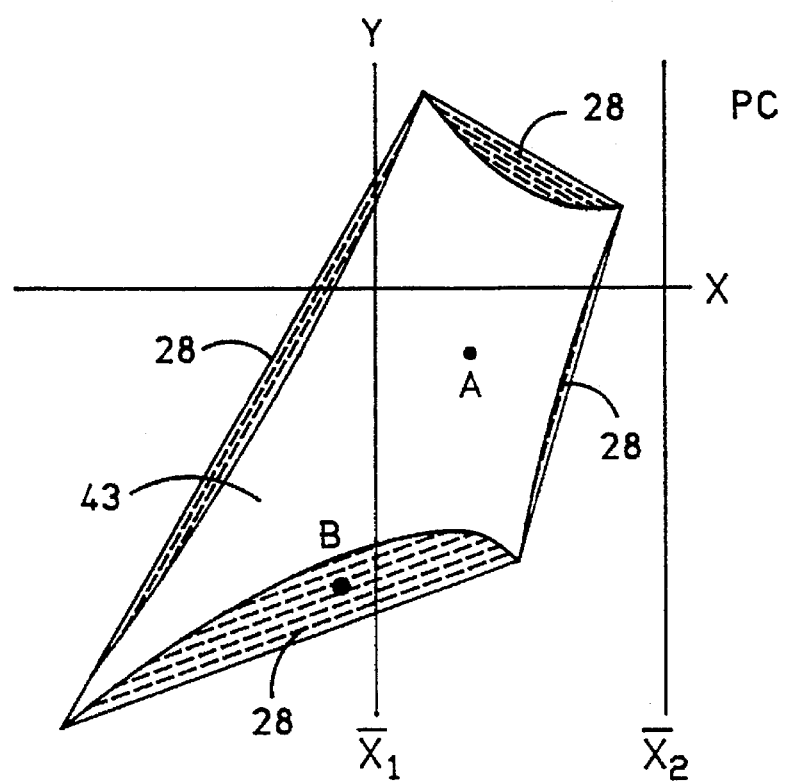

Alternatively, in FIG. 5A, the point neighborhoods are defined as circular neighborhoods 41 with radius Δr for image line AB through points $P_1$ and $P_2$. That is, the neighborhood of point $P_1$ is a circular area 41 centered at $P_1$ with radius $\Delta r_1$ and the neighborhood of $P_2$ is the circle 41 of radius $\Delta r_2$. The CC image line neighborhood is thus represented by all possible lines formed by joining points lying in both point neighborhoods 41 and is bounded by the interconnecting tangents shown 35. Note that line CD is an ambiguous line because it falls outside of one of the circular point neighborhoods but remains within the tangent line neighborhood boundaries 35. The unshaded region in FIG. 5A contains all lines in the image line neighborhood of image line AB. In FIG. 5B, the transform point A maps from image line AB in FIG. 5A and transform point B maps from ambiguous image line CD in FIG. 5A. The ambiguous regions of FIG. 5A map to the shaded regions 28 in FIG. 5B. Note that the point neighborhood bin 43 on the PC transform plane in FIG. 5B is defined by four hyperbolic arcs because of the circular point neighborhoods used in FIG. 5A.

The line neighborhood features discussed above in connection with FIGS. 1–5 demonstrate that the PC transform plane can be used to unambiguously express any line segments found in the CC image plane. Any unbounded line neighborhood on the CC image plane can be mapped to a bounded point neighborhood bin on the PC transform plane.

The Line Detector Invention

Figure 6A:
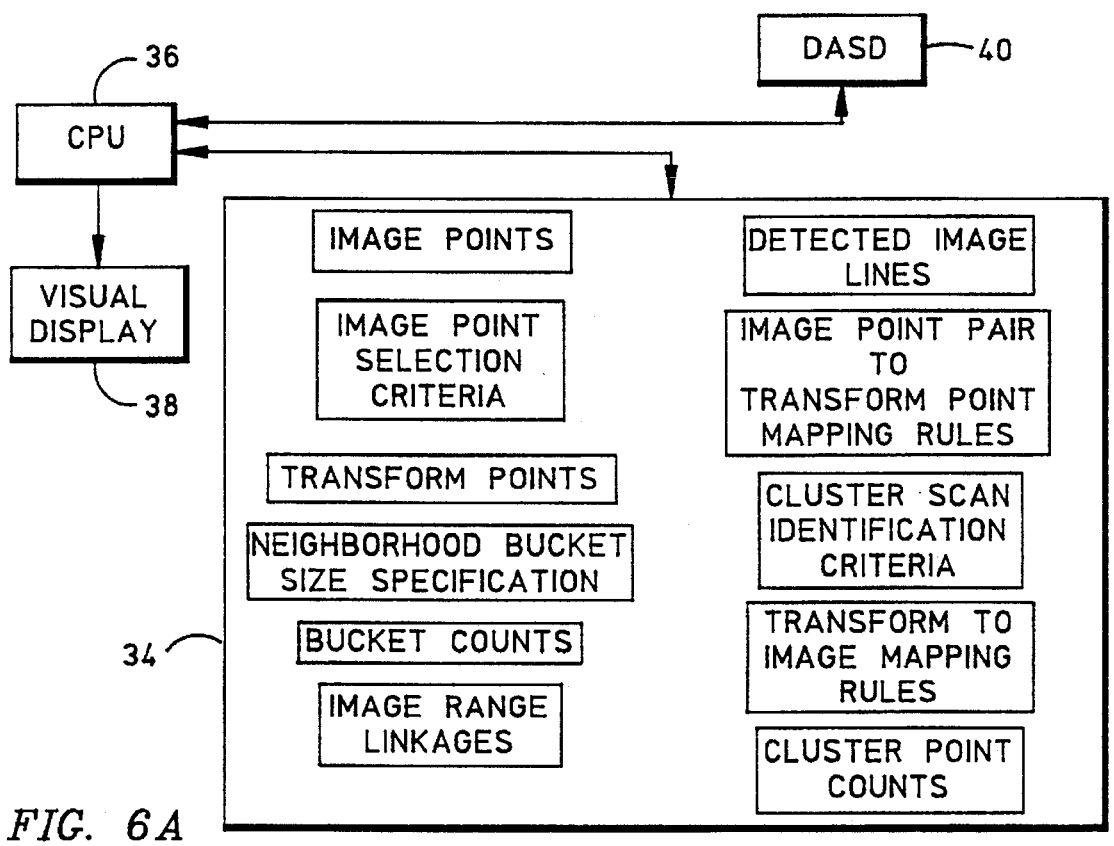
FIGS. 6A and 6B, shows two illustrative functional block diagrams of illustrative embodiments of the system of this invention.
Figure 6B:
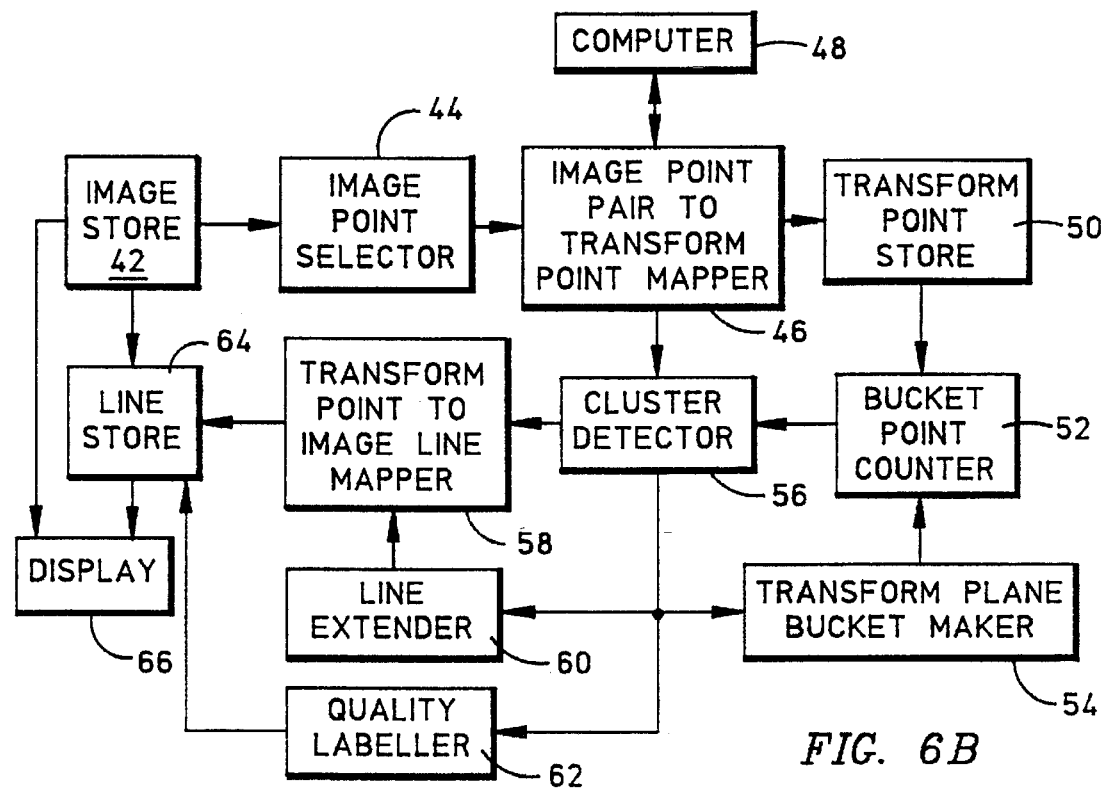
Figure 7:
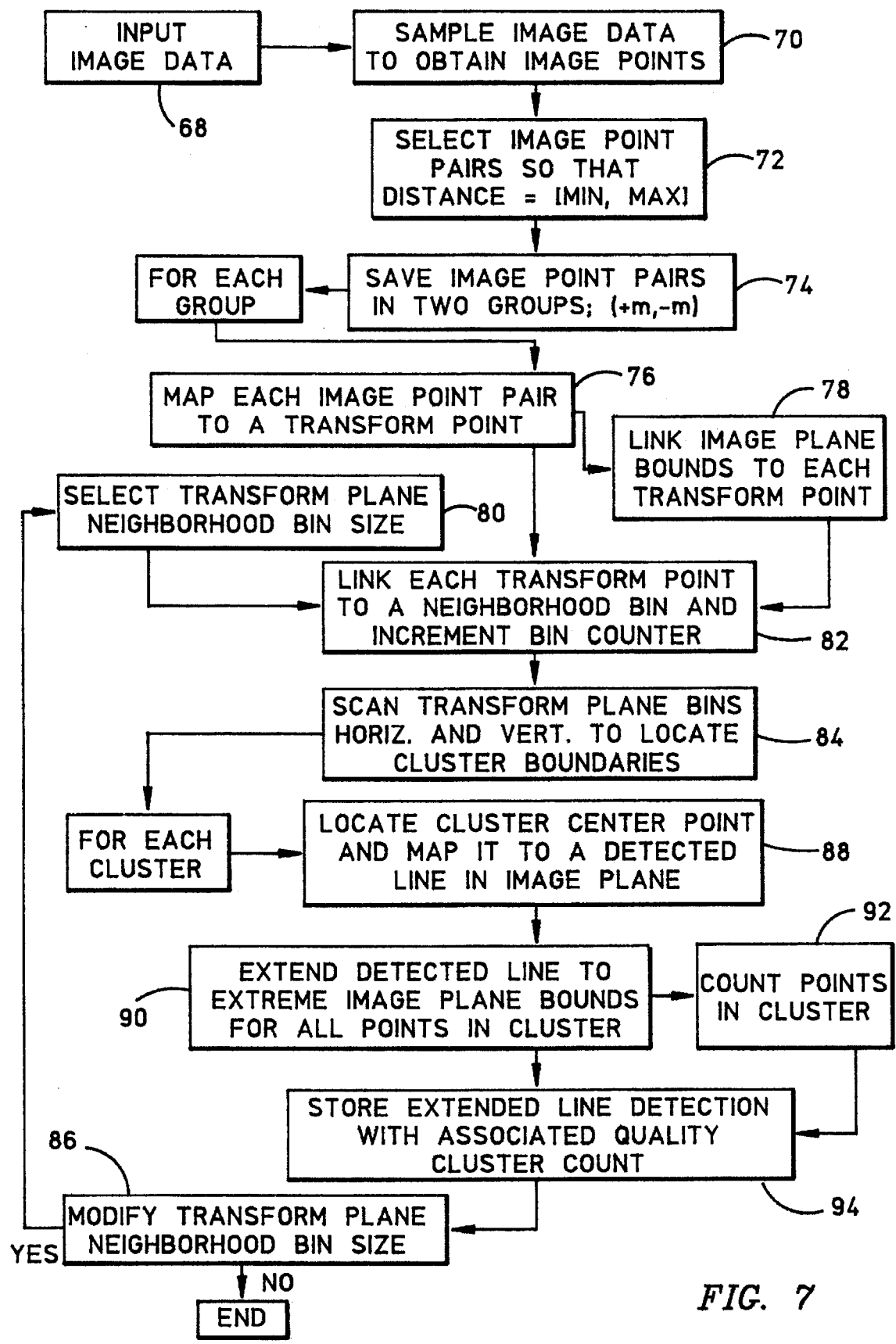
FIG. 7 shows a procedural flow diagram illustrating the method of this invention.

FIGS. 6A–6B provide two illustrative versions of functional block diagrams illustrating the system of this invention for detecting lines in an image field. FIG. 6A shows an illustrative block diagram of a computer system having a plurality of data objects in a memory representing elements of the system of this invention. FIG. 6B shows a simple functional block diagram drawn to another illustrative embodiment of the system of this invention. FIG. 7 provides an illustrative flow diagram showing the method of this invention for detecting lines in an image data field. FIGS. 6–7 are now discussed in more detail.

FIG. 6A shows an illustrative embodiment of the system of this invention consisting of a number of data objects in computer storage system 34, which is linked to a central processing unit (CPU) 36 in a manner known in the art. The illustrative embodiment also provides a visual display 38 to present images of detected lines and a direct access storage device (DASD) 40 for long term image data storage. The data objects shown as labeled blocks within storage system 34 are exemplary for the purposes of this disclosure and may be represented in any useful form known in the art, such as random access memory (RAM) data images, programmable logic array (PLA) images and the like. Computer storage system 34 may also include hierarchical storage elements such as rewritable magnetic disks, optical storage disks, magnetic tape and the like.

FIG. 6B provides an alternate illustrative functional block diagram of the system of this invention organized to illustrate an exemplary relationship between the various elements of the system of this invention. The input to the system in FIG. 6B is a two-dimensional image bit map expressed as a plurality of image data stored in an image store 42. If the image data exceed a convenient number, the image data should be sampled to reduce the total number of data to a manageable plurality. This sampling function is accomplished in an image point selector 44. Additionally, image point selector 44 selects a plurality of image point pairs from the sampled image data in image store 42 according to minimum and maximum distance threshold tests. Thus, the original image field is reduced to a plurality of properly separated image point pairs, which are then each mapped to transform points in parallel coordinates by the image point pair to transform point mapper 46. Mapper 46 is coupled to a computer 48, which performs the mathematical computations related to the mapping function.

As the image point pairs are mapped to the transform plane, the resulting plurality of transform points is stored in a transform point store 50. The transform point plurality in store 50 is scanned and assigned transform plane bucket or bin membership in accordance with the method of this invention by the bucket point counter 52. The transform plane buckets (bins) are defined by the transform plane bucket maker 54 responsive to output from a cluster detector 56 in a manner that is described below in connection with FIG. 7. Bucket point counter 52 accepts the bucket descriptions from bucket maker 54 and the transform point plurality from store 50, assigns a point count to each bucket depending on the location of the transform points in the parallel coordinate plane, and forwards these bucket counts to cluster detector 56.

Cluster detector 56 accepts image point pair range information from mapper 46 and associates these with the cluster detected according to the method described below in connection with FIG. 7. Cluster detector 56 identifies transform point clusters in the transform plane, establishes the cluster boundaries, counts the total number of transform points within the cluster, identifies a central transform point within the cluster, and forwards this central transform point to a transform point to image line mapper 58. Cluster detector 56 provides the cluster count information to bucket maker 54, to a line extender 60 and to a quality labeler 62.

Line extender 60 examines the image plane range information associated with all transform points within the boundaries of a single cluster and extracts the maximum and minimum image plane bounds associated with the single cluster in accordance with the method discussed below. These bounds are then forwarded to mapper 58, where they are used to extend the initial image line mapped from the duster center transform point. The "cluster center" image line is then extended to the maximum and minimum image plane bounds found within the associated cluster and forwarded to the line store 64. This operation is repeated for every cluster found by cluster detector 56, resulting in a plurality of extended detected lines stored in line store 64.

Quality labeler 62 accepts the image plane range and cluster point count information from cluster detector 56 and uses these data to calculate a quality label related to the number of points within a cluster divided by the associated extended image line length. The label is then normalized by dividing it by the maximum label found. This quality label is then forwarded to line store 64 wherein it is associated with the corresponding extended detected image line.

Finally, both image store 42 and line store 64 are coupled to a display 66 suitable for visual display of both the original image and the final detected lines. The embodiments of the system of this invention shown in FIGS. 6A–6B are presented as mere illustrations of the type of system suitable for implementing the method of this invention exemplified by the flow diagram shown in FIG. 7.

In FIG. 7, the first step 68 represents the input of a noisy image data field. The input data are forwarded to the sampling step 70, which extracts a representative sample of the input image data that is of manageable size. The sampled image points are considered only for situations involving large numbers of points in the original image data, such as when more than 500 image data points are available. This sampling step improves the performance of the line detection method of this invention.

After sampling, all possible pairs of the sampled image points are examined for conformance with predetermined distance criteria. All image point pairs that fall within a predetermined distance interval [rain, max] are identified in the selection step 72. Each of the image point pairs represents a line segment on the image plane having a range in both $X_1$ and $X_2$. For instance, the image point pair may be written:

$$P_1(x_{11}, x_{21}) \text{ and } P_2(X_{12}, X_{22}) \quad \text{[Eqn. 1]}$$

The two image points shown in Eqn. 1 define a line segment having a slope m and an ordinate intercept b, as is well-known. This image line can be expressed as:

$$x_2 = mx_1 + b \quad \text{[Eqn. 2]}$$

where, $$m = (x_{21} - x_{22})/(x_{11} - x_{12}) \text{ and } b = x_{21} - mx_{11} \quad \text{[Eqn. 3]}$$

The image point pair may also be written in the form:

$$P_1(a_1, ma_1 + b) \text{ and } P_2(a_2, ma_2 + b) \quad \text{[Eqn. 4]}$$

where $a_1 = x_{11}$ and $a_2 = x_2$ are the image plane bounds of the image point pair in the $X_1$ direction. The $X_2$ image plane bounds are $ma_1 + b$ and $ma_2 + b$.

The image point pair expressed in Eqn. 4 is mapped to a single point (x, y) in the transform plane by the relationship:

$$A(d/(1-m), b/(1-m)) \quad \text{[Eqn. 5]}$$

Note that the parallel coordinate transform mapping function in Eqn. 5 does not depend on the value of $a_1$ in Eqn. 4. Also, the distance d separating the two parallel $\overline{X}_1$ and $\overline{X}_2$ axes in the PC transform plane is arbitrary and may adopt any convenient value. Thus, an infinite plurality of different image point pairs having the same slope m and intercept b values, but having different values for $a_1$ and $a_2$ (Eqn. 4), all map to the same single point A in the transform plane. It is this feature of the parallel coordinate mapping function that is useful in detecting lines in image data fields.

The transform point A can be associated with the image plane bounds by simply saving the two values ($a_1$, $a_2$) with (m, b) and linking the four quantities to the transform point A. Accordingly, each point in the transform plane is completely described by the arbitrary parallel axis separation distance d and four real numbers $$[m, b, a_1 \text{ and } a_2] = A(x,y) \quad \text{[Eqn. 6]}$$

This process is shown in FIG. 7 as follows. The slope and intercept values (m, b) for all image point pairs are computed and saved in two groups in a saving step 74. The two groups are segregated according to the sign of slope m. A first group includes all image point pairs having nonpositive slopes and a second group includes all image point pairs having positive slopes. For the first group, each image point pair is mapped to a single transform point in the mapping step 76 and that transform point (Eqn. 5) is then linked to the corresponding image plane bounds ($a_1$, $a_2$) in the linking step 78.

For the second group, the sign of the positive slope m is reversed to make it negative and then the procedure discussed above for the first group is repeated independently. The terms bin and bucket are used interchangeably herein to denominate a point neighborhood in the transform plane.

For each of the two independent groups, the transform points are linked to a neighborhood bin in the transform plane that is selected by a selection step 80. Step 80 divides the bounded region between the two parallel $\overline{X}_1$ and $\overline{X}_2$ axes into a plurality of neighborhood bins ($\Delta r$, $\Delta\theta$). Each of the four-parameter transform points from step 78 is linked to the corresponding neighborhood bin in the linking step 82 and the corresponding bin counter is incremented to reflect a count of the number of transform points in each bin.

For each of the two independent groups, a plurality of neighborhood bin counts is produced and, when completed, the transform plane is scanned horizontally and then vertically in a scanning step 84 to determine local bucket count extrema. These extrema can be tested in any useful manner known in the art for detecting local clusters of points on a plane. If the bin size ($\Delta r$, $\Delta\theta$) is improper, the results of scanning step 84 will indicate a need to adjust this neighborhood bin size. The size adjustment is done in a modification step 86, which transfers control back to selection step 80. Selection step 80 then revises the transform plane neighborhood bin size and forwards the new size to linking step 82. The cluster detection process is then repeated for each of the two image pair groups. This process can be repeated according to any useful recursive procedure known in the art or can be manually repeated through any useful interactive operator mechanism known in the art.

After scanning step 84 has identified one or more useful point clusters in the transform plane, each such cluster is individually processed. First, a "mean" or "center point" C considered to represent the cluster is identified in each cluster and mapped back to the image plane as the line segment with image bounds ($a_1$, $a_2$) associated with the transform point C. This is accomplished in the locating step 88 and consists of transforming the center point C(x, y) linked to the image plane bounds ($a_1$, $a_2$) to a line segment defined as the image point pair:

$$P_1(a_1, a_1+(y-a_1)d/x) \text{ and } P_2(a_2, a_2)d/x) \quad \text{[Eqn. 7]}$$

After this initial detected line is mapped to the image plane, the remaining points in the cluster are examined and the extrema in ($a_1$, $a_2$) are found by examining the image plane bounds ($a_1$, $a_2$) for every transform point in the cluster. The initial detected line is then extended to these image plane extrema by an extension step 90. The cluster boundary is defined during the scanning step 84 according to predetermined cluster detection thresholding criteria in any useful manner known in the art for such detections. Clusters that are very close to one another are combined together to form a single cluster according to similar thresholding criteria.

After extending each initial detected line to the extreme image plane bounds found within the corresponding cluster, all points in the cluster are counted in a counting step 92 and the cluster point count is divided by the extended detected line length to provide an associated quality measure for the detected line. This quality measure corresponds to the ratio of cluster point count per unit extended detected line length. A large number of points within a single cluster representing a relatively short line provides higher confidence (quality) for that particular line detection than do a few points in a cluster representing a long line in the image plane. This quality indication and the associated image plane line parameters are then stored in storage step 94 (FIG. 7) and may be used to eliminate possible false line detections.

It should be appreciated that the above embodiments discussed in connection with FIGS. 6–7 are presented only to clearly illustrate the method and system of this invention. Other equally useful and more efficient embodiments of this invention are readily discernable from these teachings by those familiar with the art.

Experimental Line Detection Results

Figure 8:
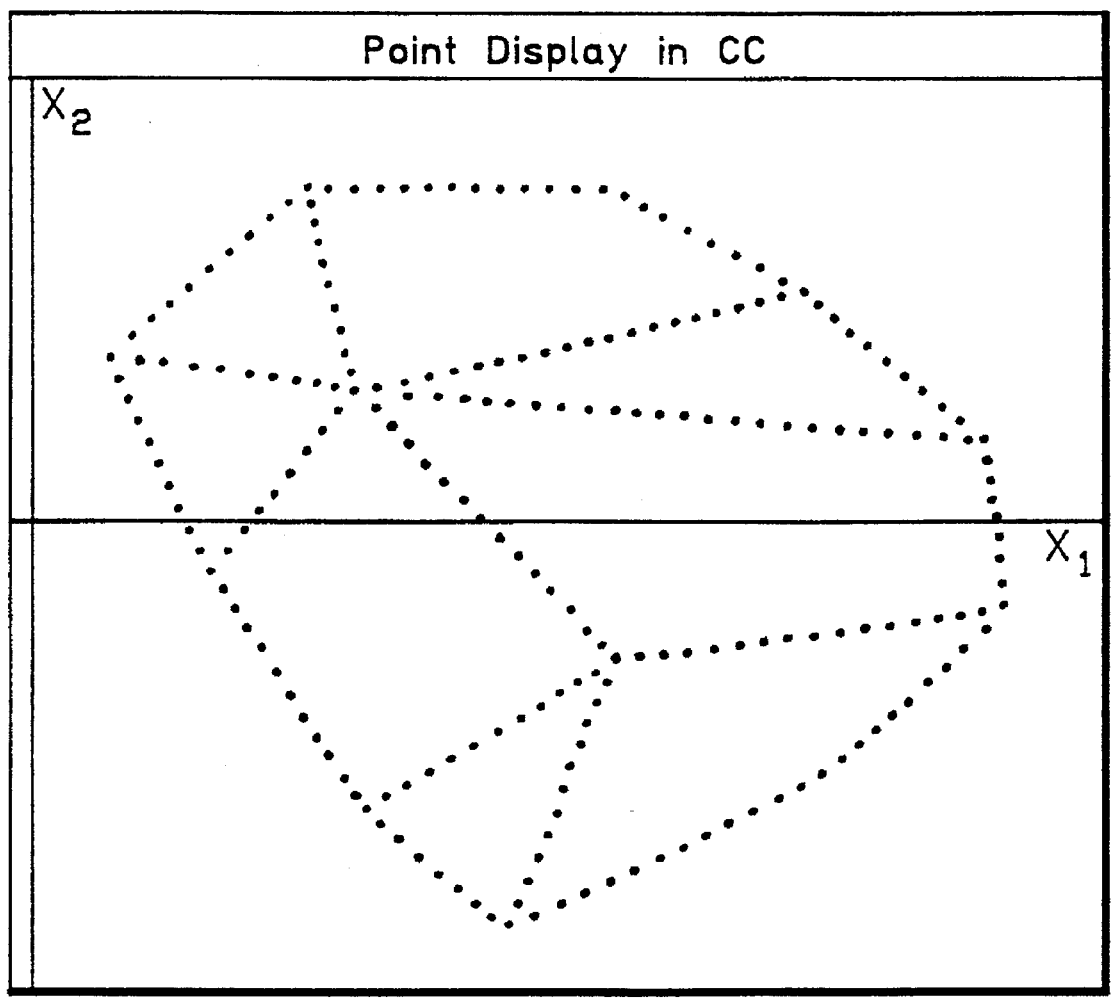
FIG. 8 shows the unsampled image data for a first image example having 19 line segments.
Figure 15:
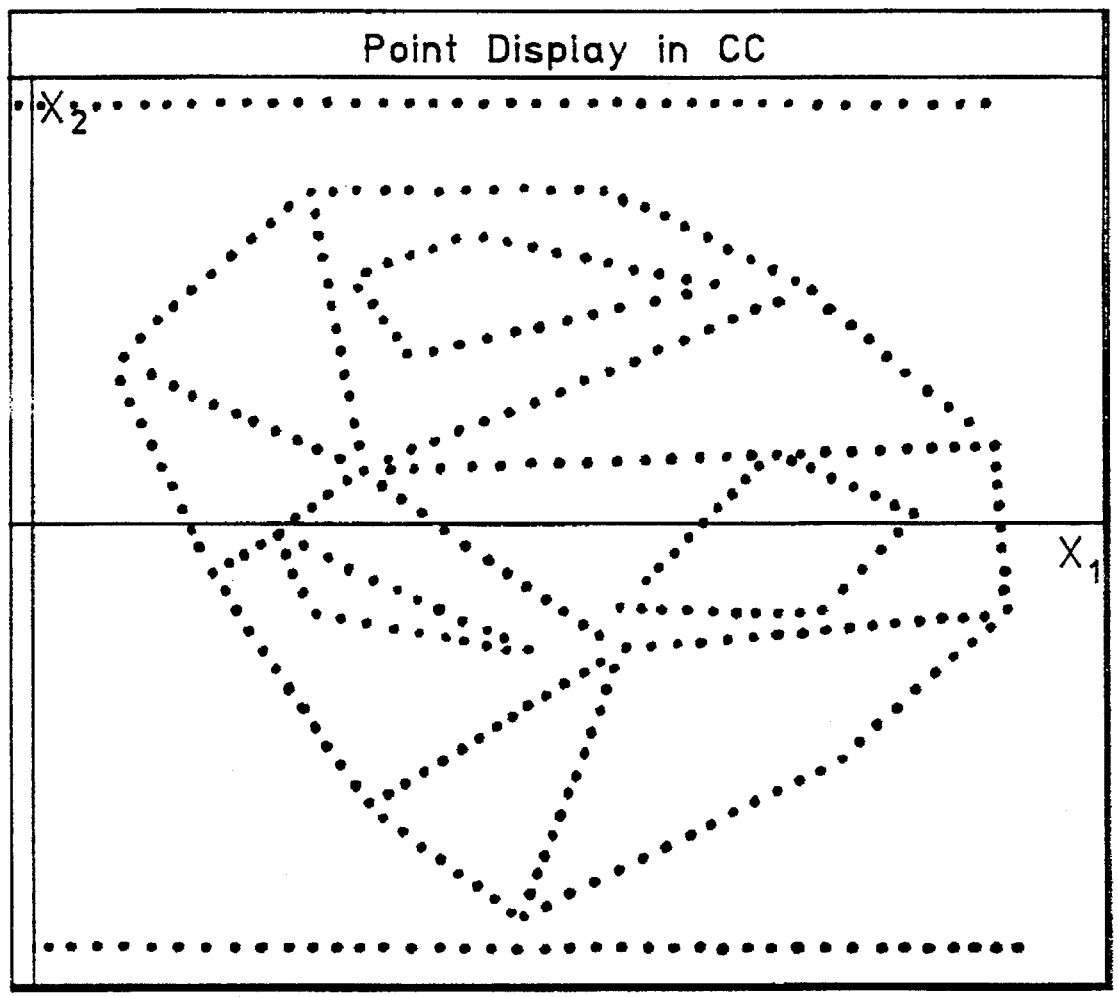
FIG. 15 shows the unsampled image data for a second image example having 32 line segments.

The method of this invention was tested by the inventors on several images. The results of these experimental tests for two images are discussed below. FIG. 8 shows the first image example having 19 line segments and FIG. 15 shows the second image example having 32 line segments.

Figure 9:
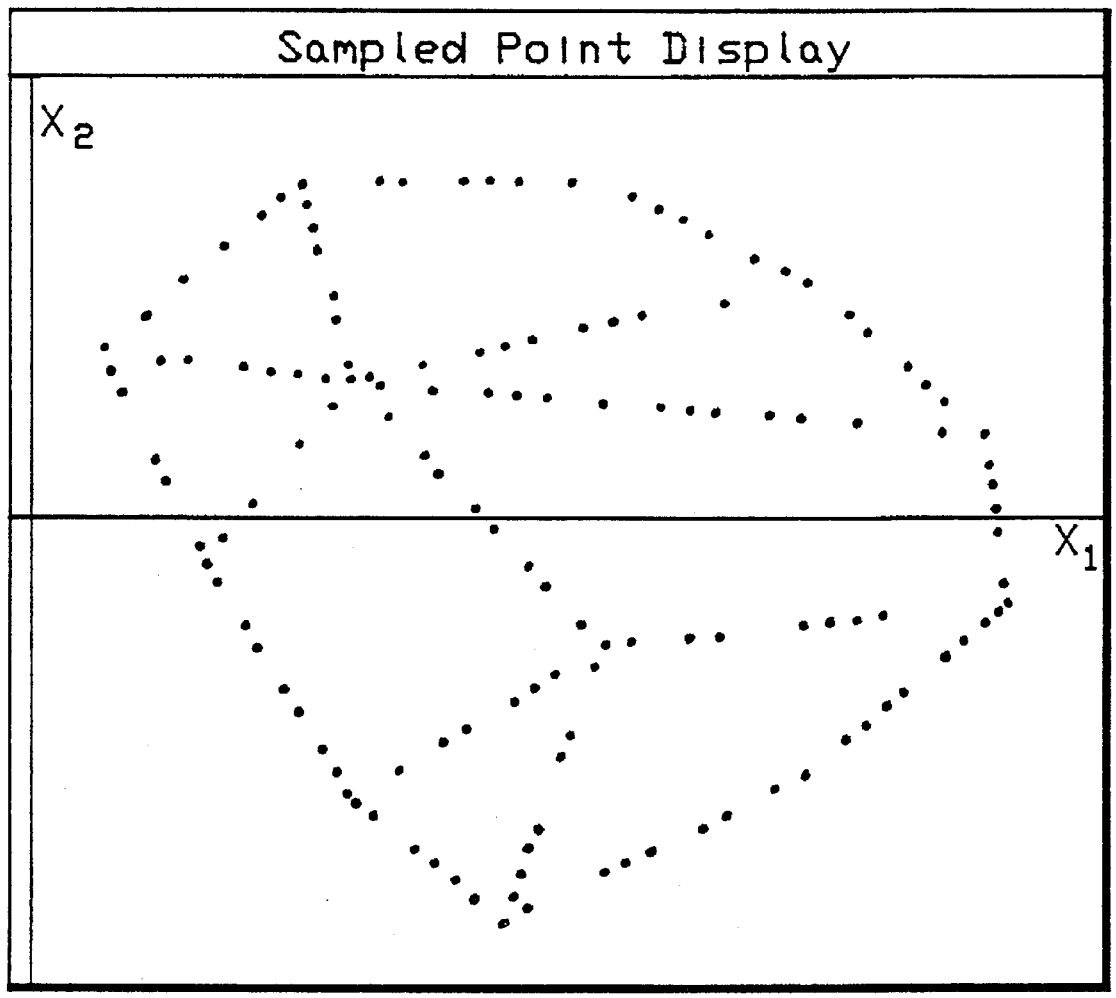
FIG. 9 shows the sampled image data from the example of FIG. 8.

For the first example in FIG. 8, the sampled image is shown in FIG. 9. The distance between each pair of image points in FIG. 9 is tested against a predetermined distance threshold range and image point pairs that fall within the acceptable distance range are identified. For the example in FIG. 8, this range was established as (0.045, 0.127), expressed as a fraction of the image diagonal. For the second example in FIG. 15, the distance range was established at (0.02, 0.046).

The qualified image point pairs from FIG. 9 are then segregated into two groups. The first group includes all image point pairs having nonpositive slope m (Eqn. 3) and the second group includes all image point pairs having positive slope m. The first group of nonpositive-sloping image point pairs are mapped to the PC transform plane shown in FIG. 10 in accordance with the parallel coordinate transform of Eqn. 5 above. The second group of positive-sloping image point pairs is mapped to the PC transform plane shown in FIG. 12 according to Eqn. 5 above with slope m reversed in sign.

As mentioned above, the transforms of nonpositive-sloping lines lie between the two parallel $\overline{X}_1$ and $\overline{X}_2$ axes. By segregating the image line pairs into two groups, all image point pairs can be transformed to this bounded region.

Figure 10:
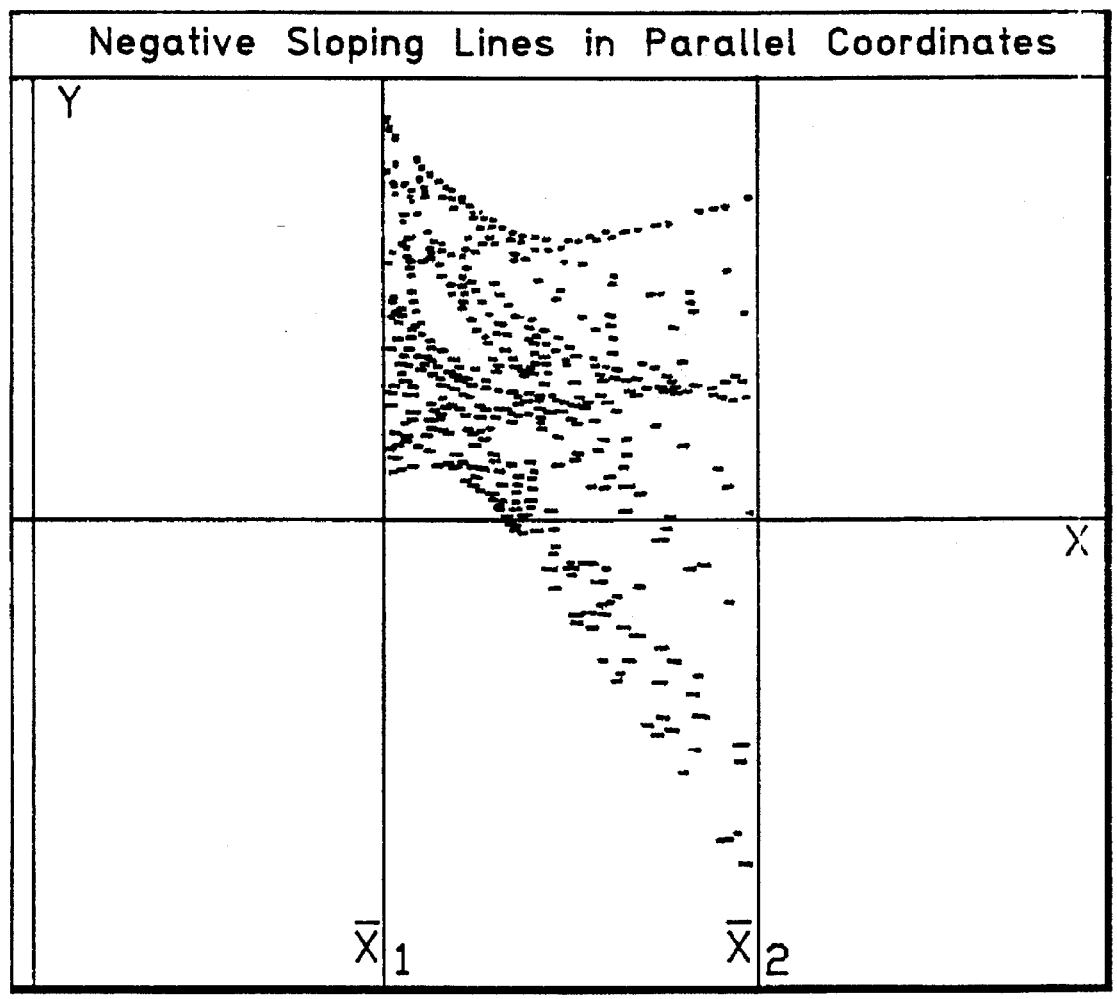
FIG. 10 shows the transform points on the PC plane corresponding to nonpositive slope lines representing the image point pairs from FIG. 9 that satisfy predetermined CC plane distance criteria.
Figure 12:
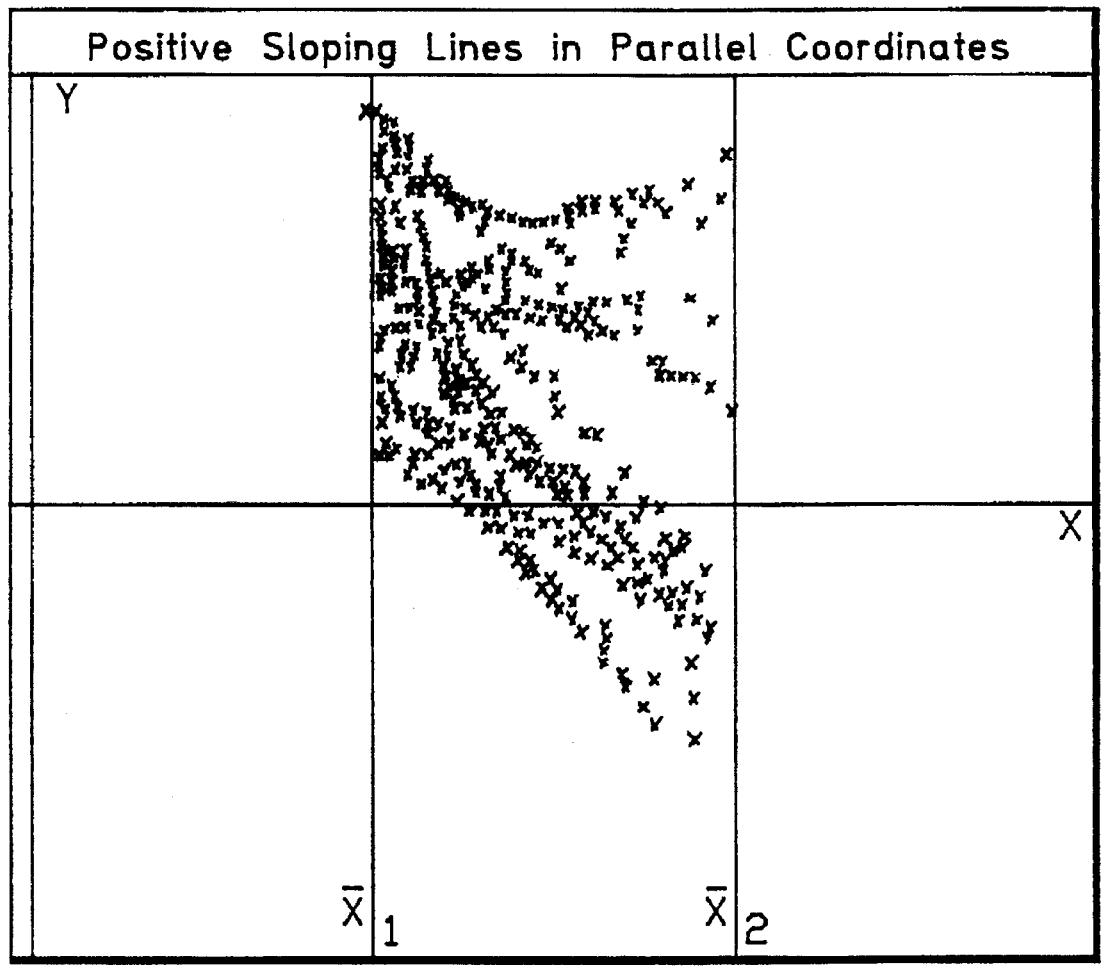
FIG. 12 shows the transform points on the PC plane corresponding to positive slope lines representing the image point pairs from FIG. 9 that satisfy predetermined CC plane distance criteria, where the sign of each slope is reversed.

The region between the parallel axes in FIGS. 10 and 12 is broken up into point neighborhood buckets or bins by defining ($\Delta r$, $\Delta\theta$), where $\Delta\theta$ determines the horizontal width of the bucket and $\Delta r$ determines the vertical width. The bucket size specification ($\Delta r$, $\Delta\theta$) is provided by the operator but may also be obtained from the same source as are the original image data. For both examples, the neighborhood bucket size was established as $\Delta\theta=2°$, $\Delta r=5\%$ of diagonal.

Each point in FIGS. 10 and 12 is mapped to one and only one of the neighborhood bucket and a count is kept for each such neighborhood bucket. Once all mapping to the transform plane is completed for the first group (FIG. 10), a horizontal scanning is accomplished using the minimum horizontal bin count (5 for FIG. 8 and 4 for FIG. 15) and then a vertical scanning is accomplished using the minimum vertical bin count (15 for FIG. 8 and 4 for FIG. 15) for each successful horizontal scan. These scans lead to identification of point clusters in the transform plane. In FIG. 10, ten distinct point clusters were identified by this technique.

Figure 11:
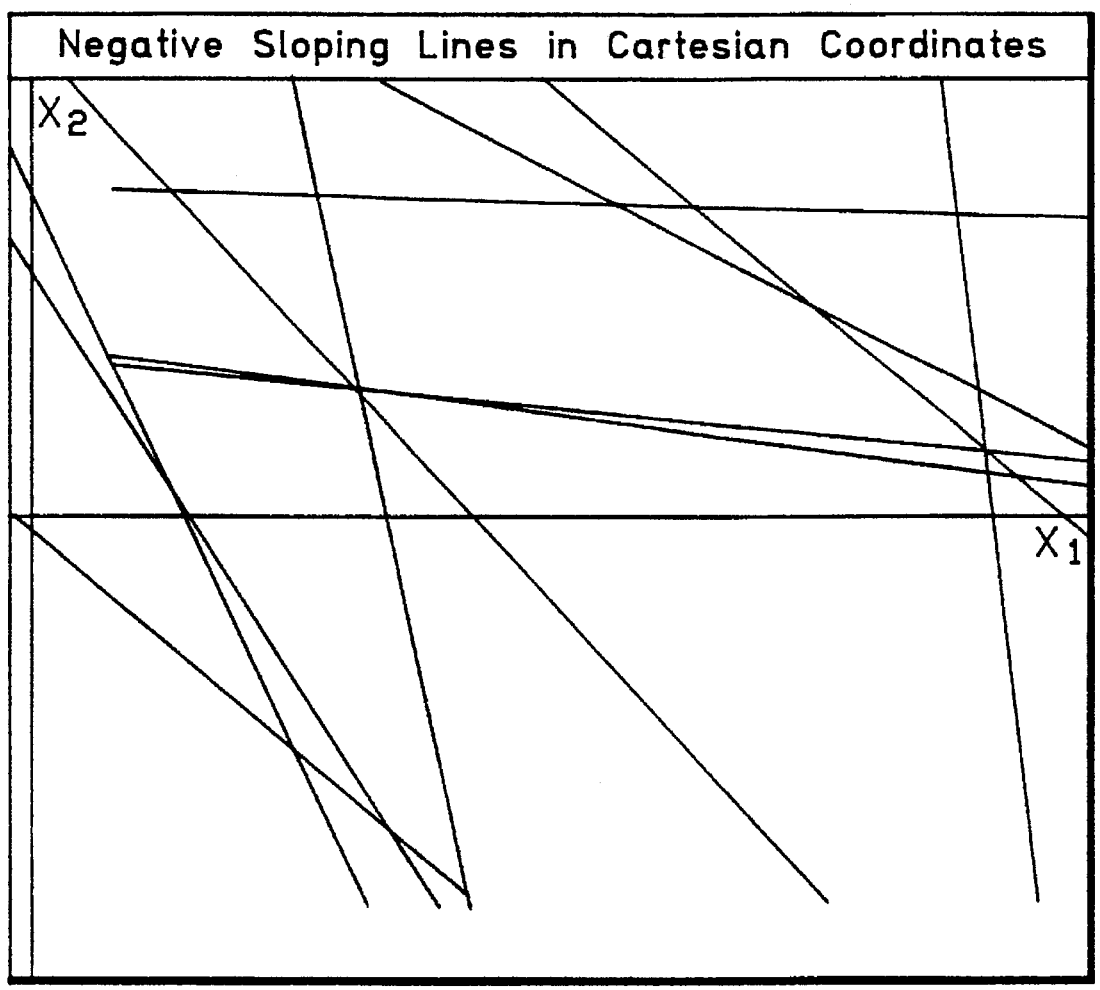
FIG. 11 shows the nonpositive slope lines on the CC plane corresponding to clusters detected in the PC plane Of FIG. 10.

For each of the ten clusters found in FIG. 10, a "center" point is identified as representing the cluster. Each of the ten cluster centerpoints is then transformed back to the image plane in FIG. 11 as a line in accordance with the transformation in Eqn. 7 above. Concurrently with the transformation, all points within each cluster are scanned to identify the maximum bounds ($a_1$, $a_2$) in $X_1$ and $X_2$ and the initial line detection is extended accordingly in the image plane. This extended size is then used to develop a quality measure for each such line detected. That is, since the image actually consists of line segments, the lower and upper bounds of all line segments within the cluster are found by searching and then are used in the image plane to establish the detected line. Clusters that are very close are combined together to form a single cluster with a combined cluster count for this purpose. The ten line segments shown in FIG. 11 are not limited to the associated image plane bounds.

Figure 13:
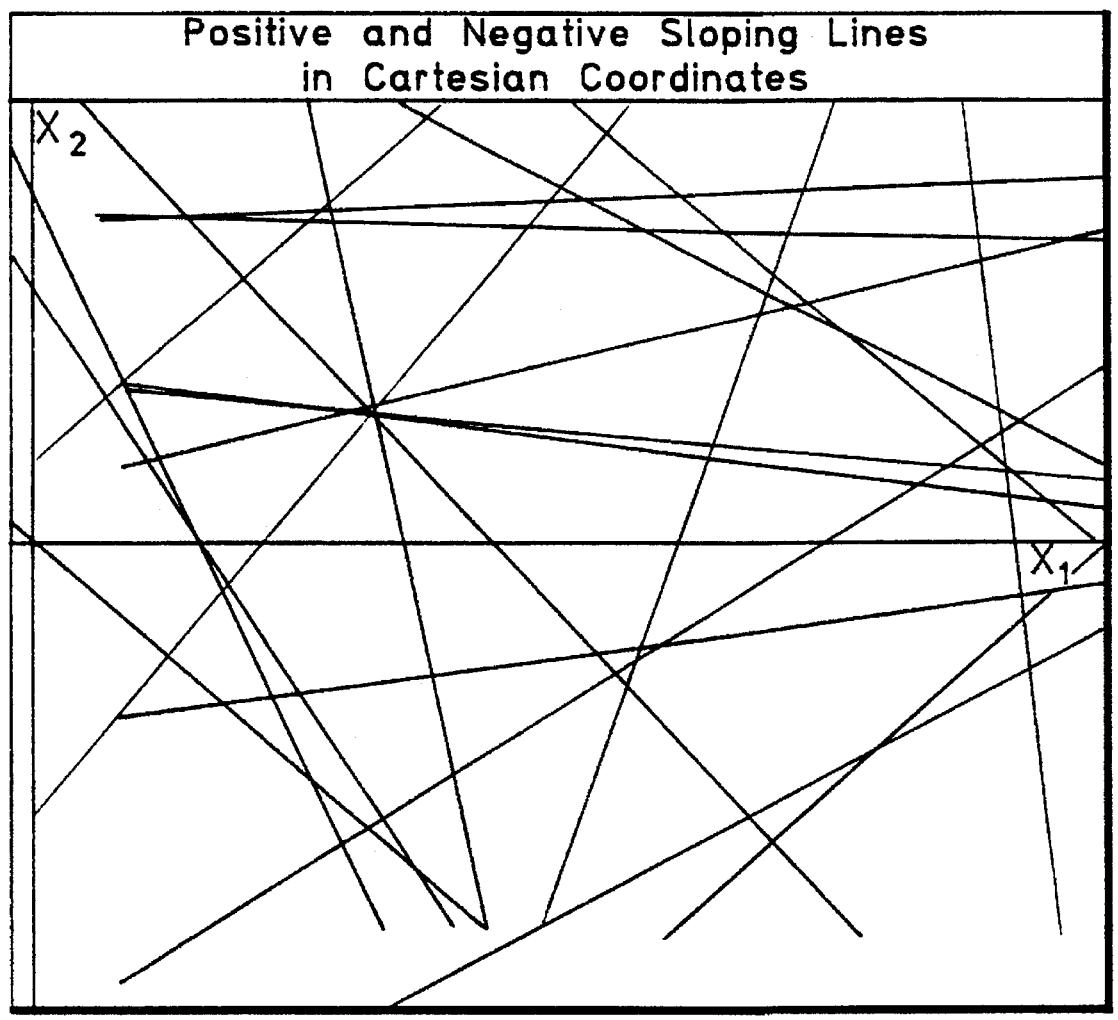
FIG. 13 shows the nonpositive and positive sloping lines on the CC plane corresponding to clusters detected in both FIGS. 10 and 12.

Similarly, ten clusters were identified in the second group of transform points shown in FIG. 12. These ten positive-sloping lines are shown in FIG. 13 overlaid by the ten nonpositive sloping lines from FIG. 11. None of the lines in FIG. 13 are shown limited to their respective image plane bounds.

Figure 14:
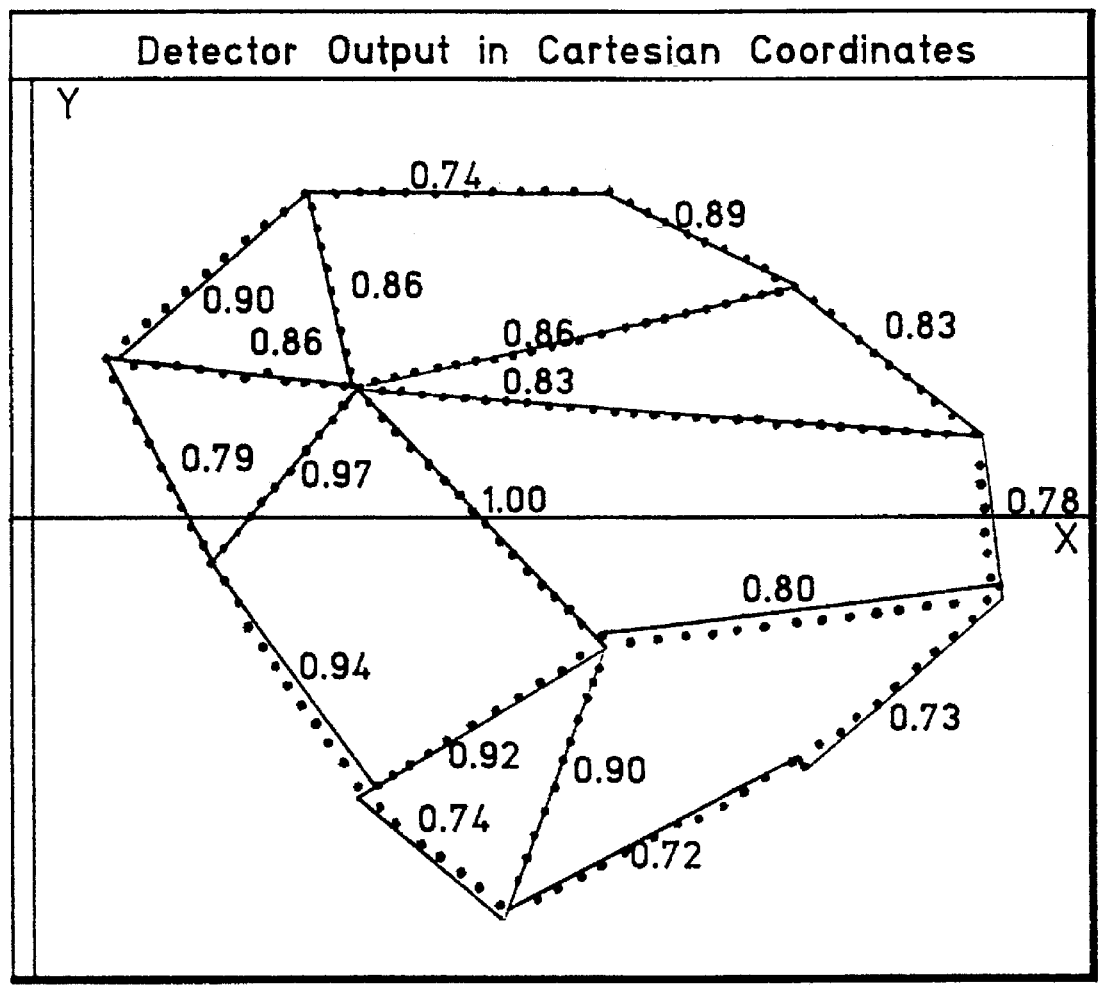
FIG. 14 shows the detected image on the CC plane for the first image example of FIGS. 8 superimposed over the initial unsampled image data of FIG. 8.

FIG. 14 shows the line segments from FIG. 13 after they have been extended and bounded on the image plane according to the cluster image plane bounds discussed above in connection with Eqn. 6. Also, each of the detected line segments in FIG. 14 is labeled with the quality measure obtained by dividing the number of transform points in each associated cluster by the length of the extended/bounded line segment. The quality measure units are arbitrary and serve to provide a level of confidence in the existence of the associated line segment in the image data. FIG. 14 also shows the initial image data from FIG. 8 overlaying the detected line segments. Note that, while some small errors can be seen, the general features of the initial image data are accurately detected by the method of this invention.

Figure 16:
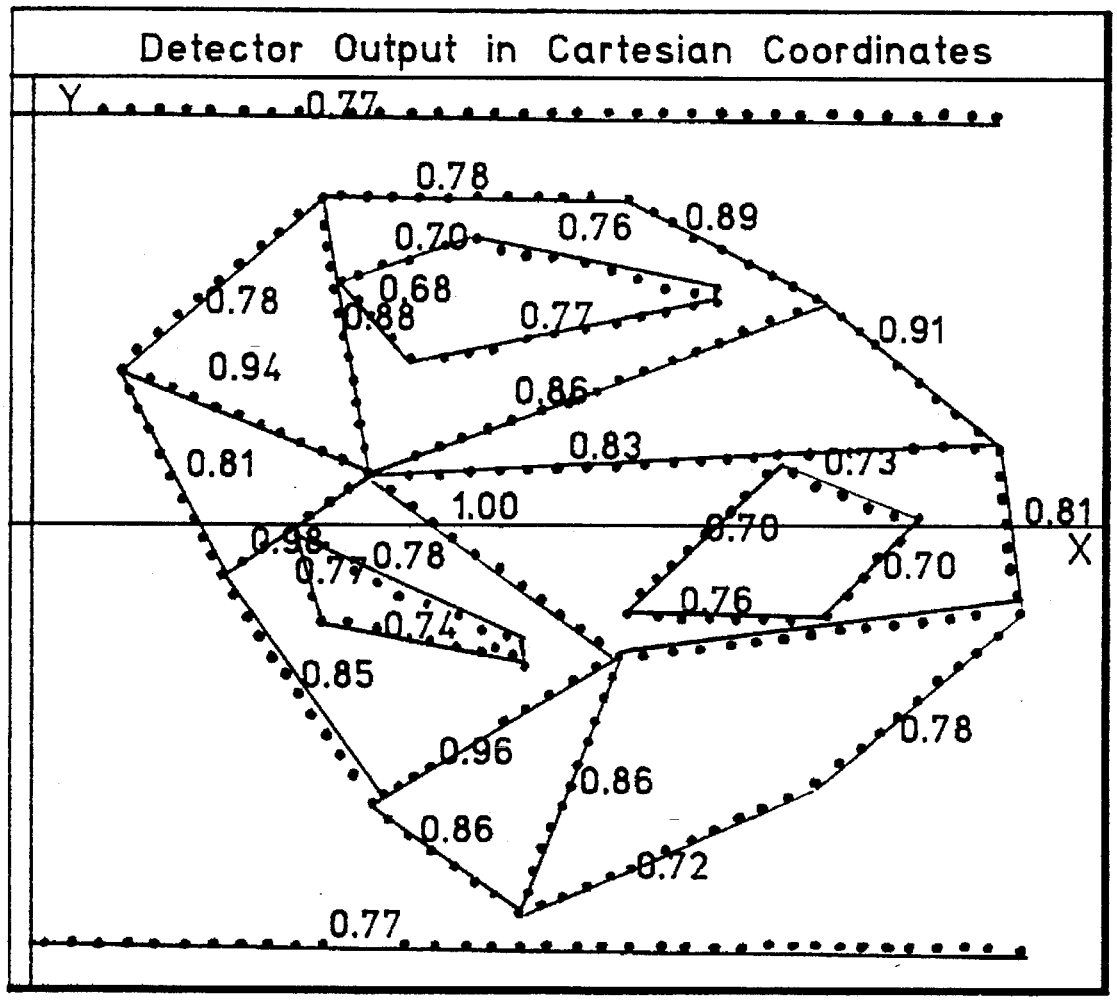
FIG. 16 shows the detected image on the CC plane for the second example of FIG. 15 superimposed over the initial unsampled image data of FIG. 15.

Using the same procedure discussed above in connection with the first example of FIG. 8, the line detections in FIG. 16 are obtained for the second image example in FIG. 15. Because there are 32 independent line segments shown in FIG. 15, there is correspondingly more error noted in FIG. 16. Nonetheless, the detected line segments in FIG. 16 provide a substantially accurate representation of the initial image data of FIG. 15.

The problem of erroneous line detections is very important in the art because most of the techniques developed using Hough transforms will find such erroneous lines (false detections). The method of this invention, to prevent erroneous line detections, imposes the image point pair distance interval to eliminate most transform points from the cluster counts. The lower bound is necessary to prevent selection of ambiguous lines into the cluster and the upper bound is necessary to reduce opportunities for selecting points belonging to different line segments into an inappropriate cluster. Selection of these bounds depends on the nature of the image. The inventors selected these bounds as fractions of the largest diagonal in the image window and have found a lower bound of 10% and an upper bound of 30% to be useful.

The system of this invention can be applied to a variety of arts, including computer vision, computer graphics (such as rendering), robotics, image processing, and the like. The fundamental two-dimensional embodiment disclosed herein can be readily extended to higher numbers of dimensions. The method of this invention is most usefully applied to images that do not have a significant number of line segments that are substantially smaller than typical and to images wherein the line segments are represented by relatively uniform image point distributions.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A computer-implemented process comprising the steps of:

(a) receiving an image containing an object and having a plurality of image pixels represented by data distributed over an image plane in $X_1$ and $X_2$, and selecting a plurality of pairs of said image pixels;

(b) mapping each said image pixel pair to a transform point in a parallel coordinates transform plane having a plurality of neighborhood buckets;

(c) counting the number of said transform points in each said neighborhood bucket to create a bucket point count for said each neighborhood bucket;

(d) analyzing said bucket point counts to detect at least one cluster of said transform points in said parallel coordinates transform plane;

(e) locating the center point in each of said at least one cluster in said parallel coordinates transform plane;

(f) detecting lines in the image plane by mapping each said center point in said at least one cluster to a corresponding detected line in said image plane;

(g) storing a plurality of data representing said at least one correspond line; and (h) presenting an image of the at least one detected line on a visual display.

2. The process of claim 1 wherein said first mapping step (b) comprises the step of:

(b.1) associating said parallel coordinates transform point with upper and lower bounds in $X_1$ and $X_2$ equivalent to the bounds of the corresponding said image pixel pair.

3. The process of claim 2 wherein said second mapping step (f) comprises the steps of:

(f.1) detecting the extreme said upper and lower bounds in $X_1$ and $X_2$ for all said transform points in said at least one cluster; and (f.2) extending each of said at least one detected line to said extreme upper and lower bounds in $X_1$ and $X_2$ on said image plane.

4. The process of claim 1 wherein each said image pixel pair in said image plane describes a line ($x_2 = mx_1 + b$) that is mapped into the transform point ($d/(1-m), b/(1-m)$) in said parallel coordinates transform plane, where $a_1$, $a_2$, b, d, and $m \neq 1$ are real numbers.

5. The process of claim 1 wherein said selecting step (a) comprises the steps of:

(a.1) discarding all said image pixel pairs that are separated by a distance greater than a predetermined maximum threshold distance; and (a.2) discarding all said image point pairs that are separated by a distance less than a predetermined minimum threshold distance.

6. The process of claim 1 wherein said first mapping step (b) is independently performed (1) for all said image pixel pairs corresponding to line segments having nonpositive slope and (2) for all said image pixel pairs corresponding to line segments having positive slope after multiplying said positive slope by $-1$.

7. The process of claim 1 wherein said storing step (g) comprises the step of:

(g.1) associating each of said at least one detected line with a quality measure corresponding to the number of said transform points in the corresponding one of said at least one cluster.

8. A system for detecting lines in a image having a plurality of data representing image pixels distributed over an image plane in $X_1$ and $X_2$, said system comprising:

image storage means for storing said image pixel data;

selection means coupled to said image storage means for selecting a plurality of pairs of said image pixels;

first mapping means coupled to said selection means for transforming each said image pixel pair to a transform point in a parallel coordinates transform plane having a plurality of neighborhood buckets;

transform storage means coupled to said first mapping means for storing a plurality of data representing said transform points and their associated said neighborhood buckets;

bucket counting means coupled to said transform storage means for assigning a bucket point count to each said neighborhood bucket representing the number of said transform points in said each neighborhood bucket;

cluster detection means coupled to said bucket counting means for identifying at least one cluster of said transform points in said parallel coordinates transform plane, said cluster being associated with a local maximum in said bucket point count;

second mapping means coupled to said cluster detection means for transforming said at least one cluster to the first detected line in said image plane;

line storage means coupled to said second mapping means for storing a plurality of data representing said first detected line; and a visual display to present an image of the first detected line.

9. The system of claim 8 wherein said second mapping means comprises:

line extension means for extending said first detected line to the extreme upper and lower bounds in $X_1$ and $X_2$ corresponding to the extreme bounds of the image pixel pairs represented by said transform points in said at least one cluster.

10. The system of claim 9 wherein said first mapping means comprises:

computation means for computing said transform point (x, y) in said parallel coordinates transform plane according to the relationships $x=d/(1-m)$ and $y=b/(1-m)$, where the corresponding said image pixel pair ($P_1$, $P_2$) is defined according to the relationships $P_1(x_{11}, x_{21})=(a_1, ma_1+b)$ and $P_2(x_{12}, x_{22})=(a_2, ma_2+b)$, which represent the line $x_2=mx_1+b$ in said image plan where $a_1$, b, d, and $m \neq 1$ are real numbers.

11. The system of claim 10 further comprising:

display means coupled to said line storage means and to said image storage means for creating a visible image of said first detected line.

12. The system of claim 8 further comprising:

display means coupled to side line storage means and to said image storage means for creating a visible image of said first detected line.

13. The system of claim 8 wherein said selection means comprises:

sorting means for distinguishing among said image pixel pairs according to a separation distance greater than a predetermined minimum threshold distance and less than a predetermined maximum threshold distance.

14. The system of claim 8 wherein said second mapping means comprises:

line extension means for extending said first detected line to the extreme upper and lower bounds in $X_1$ and $X_2$ corresponding to the extreme bounds of the image pixel pairs represented by said transform points in said at least one cluster.

15. The system of claim 8 wherein said second, mapping means further comprises:

quality labelling means for associating said first detected line with a quality measure corresponding to the number of said transform points in said at least one cluster.

16. An article of manufacture comprising a digital data storage media tangibly embodying a program of machine-readable instructions to perform method steps for detecting lines in an image, said method steps comprising:

(a) receiving an image containing an object and having a plurality of image pixels represented by data distributed over an image plane in $X_1$ and $X_2$, and selecting a plurality of pairs of said image pixels;

(b) mapping each said image pixel pair to a transform point in a parallel coordinates transform plane having a plurality of neighborhood buckets;

(c) counting the number of said transform points in each said neighborhood bucket to create a bucket point count for said each neighborhood bucket;

(d) analyzing said bucket point counts to detect at least one cluster of said transform points in said parallel coordinates transform plane;

(e) locating the center point in said at least one cluster in each of said parallel coordinates transform plane;

(f) detecting lines in the image plane by mapping each said center point in said at least one cluster to a corresponding detected line in said image plane;

(g) storing a plurality of data representing said at least one corresponding detected line; and (h) presenting an image of the at least one detected line on a visual display.

17. The article of manufacture of claim 16, wherein said first mapping step (b) comprises the step of:

(b.1) associating said parallel coordinates transform point with upper and lower bounds in $X_1$ and $X_2$ equivalent to the bounds of the corresponding said image pixel pair.

18. The article of manufacture of claim 17, wherein said second mapping step (f) comprises the steps of:

(f.1) detecting the extreme said upper and lower bounds in $X_1$ and $X_2$ for all said transform points in said at least one cluster; and (f.2) extending each of said at least one detected line to said extreme upper and lower bounds in $X_2$ and $X_2$ on said image plane.

19. The article of manufacture of claim 16, wherein each said image pixel pair in said image plane describes a line ($x_2=mx_1+b$) that is mapped into the transform point ($d/(1-m), b/(1-m)$) in said parallel coordinates transform plane, where $a_1$, $a_2$, b, d, and $m \neq 1$ are real numbers.

20. The article of manufacture of claim 16, wherein said selecting step (a) comprises the steps of:

(a.1) discarding all said image pixel pairs that are separated by a distance greater than a predetermined maximum threshold distance; and (2.a) discarding all said image pixel pairs that are separated by a distance less than a predetermined minimum threshold distance.

21. The article of manufacture of claim 16, wherein said first mapping step (b) is independently performed (1) for all said image pixel pairs corresponding to line segments having nonpositive slope and (2) for all said image pixel pairs corresponding to line segments having positive slope after multiplying said positive slope by −1.

22. The article of manufacture of claim 21, wherein said storing step (g) comprises the step of:

(g.1) associating each of said at least one detected line with a quality measure corresponding to the number of said transform points in the corresponding one of said at least one cluster.

23. An apparatus comprising a digital data computer programmed to perform method steps to detect lines in an image, said method steps comprising:

(a) receiving an image containing an object and having a plurality of image pixels represented by data distributed over an image plane in $X_1$ and $X_2$, and selecting a plurality of pairs of said image pixels;

(b) mapping each said image pixel pair to a transform point in a parallel coordinates transform plane having a plurality of neighborhood buckets;

(c) counting the number of said transform points in each said neighborhood bucket to create a bucket point count for said each neighborhood bucket;

(d) analyzing said bucket point counts to detect at least one cluster of said transform points in said parallel coordinates transform plane;

(e) locating the center point in said at least one cluster in each of said parallel coordinates transform plane;

(f) detecting lines in the image plane by mapping each said center point in said at least one cluster to a corresponding detected line in said image plane;

(g) storing a plurality of data representing said at least one corresponding detected line; and (h) presenting an image of the at least one detected line on a visual display.

24. The apparatus of claim 23, wherein said first mapping step (b) comprises the step of:

(b.1) associating said parallel coordinates transform point with upper and lower bounds in $X_1$ and $X_2$ equivalent to the bounds of the corresponding said image pixel pair.

25. The apparatus of claim 24, wherein said second mapping step (f) comprises the steps of:

(f.1) detecting the extreme said upper and lower bounds in $X_1$ and $X_2$ for all said transform points in said at least one cluster; and (f.2) extending each of said at least one detected line to said extreme upper and lower bounds in $X_1$ and $X_2$ on said image plane.

26. The apparatus of claim 23, wherein each said image pixel pair in said image plane describes a line $(x_2=mx_1+b)$ that is mapped into the transform point $(d/(1-m),b/(1-m))$ in said parallel coordinates transform plane, where $a_1$, $a_2$, b, d, and m≠1 are real numbers.

27. The apparatus of claim 23, wherein said selecting step (a) comprises the steps of:

(a.1) discarding all said image pixel pairs that are separated by a distance greater than a predetermined maximum threshold distance; and (a.2) discarding all said image pixel pairs that are separated by a distance less than a predetermined minimum threshold distance.

28. The apparatus of claim 23, wherein said first mapping step (b) is independently performed (1) for all said image pixel pairs corresponding to line segments having nonpositive slope and (2) for all said image pixel pairs corresponding to line segments having positive slope after multiplying said positive slope by−1.

29. The apparatus of claim 23, wherein said storage step (g) comprises the step of:

(g.1) associating each of said at least one detected line with a quality measure corresponding to the number of said transform points in the corresponding one of said at least one cluster.

* * * * *

UNITED STATES PATENT AND TRADEMARK OFFICE
CERTIFICATE OF CORRECTION

PATENT NO. : 5,631,982
DATED : May 20, 1997
INVENTOR(S) : Inselberg et al

It is certified that error appears in the above-indentified patent and that said Letters Patent is hereby corrected as shown below:

Column 14, line 29, change "correspond line" to --corresponding detected line--.
Column 14, line 57, change "point" to --pixel--"
Column 15, line 52, change "plan" to --plane--.
Column 15, line 53, change "$a_1$, b, d," to --$a_1$, $a_2$, b, d,--.
Column 15, line 59, change "side line" to --said line--.
Column 16, line 8, change "second, mapping" to --second mapping--.
Column 16, line 53, change "in $X_2$ and $X_2$" to --in $X_1$ and $X_2$--.
Column 16, line 65, change "in (2.a)" to --(a.2)--.
Column 17, line 7, change "claim 21" to --claim 16--.
Column 18, line 15, insert after "pixel pair" and before "in said image" --[($a_1$, $ma_1$ + b), ($a_2$, $ma_2$ + b)]--.
Column 18, line 34, change "storage" to --storing--.

Signed and Sealed this

Twenty-fifth Day of November, 1997

Attest:

BRUCE LEHMAN

*Attesting Officer*       *Commissioner of Patents and Trademarks*